United States Patent
Dolbier et al.

(10) Patent No.: US 10,166,470 B2
(45) Date of Patent: Jan. 1, 2019

(54) METHOD FOR PROVIDING A VIRTUAL WORLD LAYER

(75) Inventors: George R. Dolbier, Banks, OR (US);
Rick A. Hamilton, II, Charlottesville, VA (US); Neil A. Katz, Parkland, FL (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 12/184,309

(22) Filed: Aug. 1, 2008

(65) Prior Publication Data

US 2010/0031164 A1    Feb. 4, 2010

(51) Int. Cl.
| | | |
|---|---|---|
| A63F 13/85 | (2014.01) | |
| A63F 13/352 | (2014.01) | |
| A63F 13/77 | (2014.01) | |
| G09B 9/00 | (2006.01) | |
| H04L 12/18 | (2006.01) | |
| G06T 15/00 | (2011.01) | |

(52) U.S. Cl.
CPC ............ *A63F 13/352* (2014.09); *A63F 13/77* (2014.09); *G09B 9/003* (2013.01); *H04L 12/1822* (2013.01); *A63F 2300/209* (2013.01); *A63F 2300/5533* (2013.01); *A63F 2300/6063* (2013.01)

(58) Field of Classification Search
CPC ......... G06T 15/00; G06T 13/40; G06F 3/048; G06N 3/004; G06N 3/006
See application file for complete search history.

(56) References Cited

U.S. PATENT DOCUMENTS

| | | | |
|---|---|---|---|
| 5,319,758 A | 6/1994 | Arai et al. | |
| 5,736,982 A | 4/1998 | Suzuki et al. | |
| 5,852,672 A | 12/1998 | Lu | |
| 5,880,788 A | 3/1999 | Bregler | |
| 6,069,632 A | 5/2000 | Mullaly et al. | |
| 6,088,698 A * | 7/2000 | Lipkin | G06F 17/30398 |
| 6,227,974 B1 | 5/2001 | Eilat et al. | |
| 6,332,163 B1 * | 12/2001 | Bowman-Amuah | H04L 12/4604 709/217 |

(Continued)

FOREIGN PATENT DOCUMENTS

| | | |
|---|---|---|
| JP | 10222692 A | 8/1998 |
| WO | 2007086038 A1 | 8/2007 |

OTHER PUBLICATIONS

Matias Rauterberg,Entertainment Computing—ICEC 2004,Third International Conference Eindhoven, The Netherlands, Sep. 1-3, 2004, Proceedings, pp. 241-247.

(Continued)

*Primary Examiner* — Phong Nguyen
(74) *Attorney, Agent, or Firm* — Janaki K. Davda; Konrad, Raynes, Davda & Victor LLP

(57) ABSTRACT

A method for providing virtual world functionality to a user of a base virtual world having base virtual world functionality, including providing a virtual world layer having virtual world layer functionality beyond the base virtual world functionality, coupling the virtual world layer to the base virtual world and coupling the virtual world layer to the user. User access to the base virtual world functionality and to the virtual world layer functionality by the virtual world layer is provided.

17 Claims, 17 Drawing Sheets

(56) References Cited

U.S. PATENT DOCUMENTS

| | | | |
|---|---|---|---|
| 6,340,332 B1 | 1/2002 | Rimoto et al. | |
| 6,377,263 B1 | 4/2002 | Falacara et al. | |
| 6,421,047 B1 | 7/2002 | de Groot | |
| 6,522,333 B1 | 2/2003 | Hatlelid et al. | |
| 6,553,006 B1 | 4/2003 | Kalliokulju et al. | |
| 6,564,250 B1 | 5/2003 | Nguyen | |
| 6,572,662 B2 | 6/2003 | Manohar et al. | |
| 6,629,112 B1 | 9/2003 | Shank et al. | |
| 6,629,129 B1* | 9/2003 | Bookspan | G06Q 10/10 709/204 |
| 6,677,976 B2 | 1/2004 | Parker et al. | |
| 6,714,987 B1* | 3/2004 | Amin | H04L 29/06027 709/200 |
| 6,798,407 B1 | 9/2004 | Benman | |
| 6,907,395 B1 | 6/2005 | Hunt et al. | |
| 6,912,565 B1 | 6/2005 | Powers et al. | |
| 7,027,975 B1 | 4/2006 | Pazandak et al. | |
| 7,155,380 B2 | 12/2006 | Hunt et al. | |
| 7,155,680 B2 | 12/2006 | Akazawa et al. | |
| 7,240,067 B2 | 7/2007 | Timmons | |
| 7,269,632 B2 | 9/2007 | Edeker et al. | |
| 7,337,208 B2 | 2/2008 | Gall et al. | |
| 7,342,587 B2 | 3/2008 | Danzig et al. | |
| 7,412,422 B2 | 8/2008 | Shiloh | |
| 7,445,549 B1 | 11/2008 | Best | |
| 7,564,476 B1 | 7/2009 | Coughlan et al. | |
| 7,685,237 B1 | 3/2010 | Weaver et al. | |
| 7,882,222 B2 | 2/2011 | Dolbier et al. | |
| 7,990,384 B2 | 8/2011 | Cosatto et al. | |
| 7,996,818 B1 | 8/2011 | Venugopal | |
| 8,026,918 B1 | 9/2011 | Murphy | |
| 8,527,625 B2 | 9/2013 | Dolbier et al. | |
| 8,957,914 B2 | 2/2015 | Dolbier et al. | |
| 9,324,173 B2 | 4/2016 | Castelli et al. | |
| 2001/0030667 A1* | 10/2001 | Kelts | G06F 3/0481 715/854 |
| 2001/0037316 A1 | 11/2001 | Shiloh | |
| 2001/0037508 A1 | 11/2001 | Hindus et al. | |
| 2002/0129106 A1 | 9/2002 | Gutfreund | |
| 2002/0152268 A1* | 10/2002 | Kureshy et al. | 709/203 |
| 2002/0188678 A1* | 12/2002 | Edecker | H04L 29/12066 709/204 |
| 2003/0014524 A1 | 1/2003 | Tormasov | |
| 2003/0115132 A1 | 6/2003 | Iggland | |
| 2003/0117485 A1 | 6/2003 | Mochizuki et al. | |
| 2003/0177187 A1* | 9/2003 | Levine | A63F 13/10 709/205 |
| 2003/0177195 A1 | 9/2003 | Han et al. | |
| 2004/0017385 A1* | 1/2004 | Cosman | G06T 17/05 345/629 |
| 2004/0030741 A1* | 2/2004 | Wolton | G06F 17/30873 709/202 |
| 2004/0054740 A1* | 3/2004 | Daigle et al. | 709/206 |
| 2004/0068518 A1 | 4/2004 | McDowell | |
| 2005/0021625 A1 | 1/2005 | Fujimura et al. | |
| 2005/0137015 A1* | 6/2005 | Rogers et al. | 463/42 |
| 2005/0204287 A1 | 9/2005 | Wang | |
| 2005/0216558 A1 | 9/2005 | Flesch et al. | |
| 2006/0031080 A1* | 2/2006 | Mallya | G06Q 40/04 709/206 |
| 2006/0053380 A1* | 3/2006 | Spataro | G06Q 10/10 715/753 |
| 2006/0115157 A1 | 6/2006 | Mori et al. | |
| 2006/0123127 A1 | 6/2006 | Littlefield | |
| 2006/0181535 A1 | 8/2006 | Watt | |
| 2006/0256135 A1* | 11/2006 | Aoyama | A63F 13/12 345/629 |
| 2007/0013691 A1* | 1/2007 | Jung | G06N 3/006 345/419 |
| 2007/0035831 A1 | 2/2007 | Gutierrez | |
| 2007/0126733 A1 | 6/2007 | Yang et al. | |
| 2007/0130001 A1 | 6/2007 | Jung et al. | |
| 2007/0188502 A1 | 8/2007 | Bishop | |
| 2007/0203828 A1 | 8/2007 | Jung et al. | |
| 2007/0220435 A1 | 9/2007 | Sriprakash et al. | |
| 2007/0233605 A1* | 10/2007 | Mueller | G06Q 10/087 705/52 |
| 2007/0233839 A1 | 10/2007 | Gaos | |
| 2007/0248261 A1 | 10/2007 | Zhou et al. | |
| 2007/0260984 A1 | 11/2007 | Marks et al. | |
| 2007/0294171 A1 | 12/2007 | Sprunk | |
| 2008/0005237 A1* | 1/2008 | Borys | H04L 12/581 709/204 |
| 2008/0052242 A1 | 2/2008 | Merritt et al. | |
| 2008/0059570 A1* | 3/2008 | Bill | 709/203 |
| 2008/0104079 A1* | 5/2008 | Craig | 707/9 |
| 2008/0155019 A1* | 6/2008 | Wallace | A63F 13/12 709/204 |
| 2008/0215434 A1 | 9/2008 | Jung et al. | |
| 2008/0215972 A1 | 9/2008 | Zalewski et al. | |
| 2008/0215975 A1 | 9/2008 | Harrison et al. | |
| 2008/0215994 A1* | 9/2008 | Harrison | A63F 13/10 715/757 |
| 2008/0228607 A1 | 9/2008 | Jung et al. | |
| 2008/0263460 A1 | 10/2008 | Altberg et al. | |
| 2008/0267282 A1 | 10/2008 | Kalipatnapu et al. | |
| 2008/0267449 A1 | 10/2008 | Dumas et al. | |
| 2008/0274769 A1 | 11/2008 | Linden | |
| 2008/0307066 A1* | 12/2008 | Amidon | G06Q 10/10 709/217 |
| 2009/0002479 A1 | 1/2009 | Sangberg et al. | |
| 2009/0024636 A1 | 1/2009 | Shiloh | |
| 2009/0027337 A1 | 1/2009 | Hildreth | |
| 2009/0046094 A1* | 2/2009 | Hamilton, II | A63F 13/12 345/419 |
| 2009/0055484 A1 | 2/2009 | Vuong et al. | |
| 2009/0077475 A1* | 3/2009 | Koster | A63F 13/12 715/757 |
| 2009/0089684 A1 | 4/2009 | Boss et al. | |
| 2009/0100352 A1* | 4/2009 | Huang et al. | 715/757 |
| 2009/0106347 A1* | 4/2009 | Harwood | G06F 9/4445 709/203 |
| 2009/0110352 A1 | 4/2009 | Schorpp et al. | |
| 2009/0113319 A1 | 4/2009 | Dawson et al. | |
| 2009/0138943 A1 | 5/2009 | Kawanaka | |
| 2009/0144173 A1 | 6/2009 | Mo et al. | |
| 2009/0164518 A1* | 6/2009 | Ghafoor | G06Q 30/06 |
| 2009/0187604 A1* | 7/2009 | Guo | G06F 9/4426 |
| 2009/0241049 A1* | 9/2009 | Bates | H04L 67/38 715/771 |
| 2009/0251457 A1* | 10/2009 | Walker | G06T 17/10 345/418 |
| 2009/0288015 A1 | 11/2009 | Fujioka | |
| 2009/0300521 A1* | 12/2009 | Jerrard-Dunne | G06Q 10/10 715/757 |
| 2009/0307611 A1* | 12/2009 | Riley | A63F 13/12 715/757 |
| 2010/0020100 A1 | 1/2010 | Dolbier et al. | |
| 2010/0026681 A1 | 2/2010 | Dolbier et al. | |
| 2010/0030854 A1 | 2/2010 | Dolbier et al. | |
| 2010/0070859 A1 | 3/2010 | Shuster et al. | |
| 2011/0039526 A1 | 2/2011 | Ait-Ameur | |
| 2012/0064878 A1 | 3/2012 | Castro et al. | |
| 2012/0113937 A1 | 5/2012 | Aramoto et al. | |
| 2012/0221955 A1 | 8/2012 | Raleigh et al. | |
| 2012/0257571 A1 | 10/2012 | Liao | |
| 2012/0307798 A1 | 12/2012 | Zhou et al. | |
| 2013/0016657 A1 | 1/2013 | Muhanna et al. | |
| 2013/0149987 A1 | 6/2013 | Cheng et al. | |
| 2014/0161026 A1 | 6/2014 | Stojanovski et al. | |
| 2017/0006091 A1 | 1/2017 | Cabrera et al. | |

OTHER PUBLICATIONS

Tsuneo Yoshikawa, Hitoshi Ueda, Construction of Virtual World Using Dynamic Modules and Interaction Modules, Proceedings of the 1996 IEEE International Conference on Robotics and Automation Minneapolis, Minnesota Apr. 1996, pp. 2358-2364.

Shinya Kawanaka, A Method to do Shopping in Securely by Making Virtual World, Document No. JP920070131.

(56) References Cited

OTHER PUBLICATIONS

Gabriel Zachmann, A Language for Describing Behavior of and Interaction with Virtual Worlds, VRST '96 Proceedings of the ACM Symposium on Virtual Reality Technology, 1999, Jul. 1996, pp. 143-150.

Mary Lou Maher, et al., Agents for multi-disciplinary design in virtual worlds, Artificial Intelligence for Engineering Design, Analysis and Manufacturing, vol. 21, No. 3, pp. 267-277, 2007.

Elhadi Shakshuki, et al., Agent Frameworks in FCVW, Proceedings of the 19th International Conference on Advanced Information Networking and Applications (AINA '05), 2005.

John W. Barrus, et al., Locales:Supporting Large Multiuser Virtual Environments, A Mitsubishi Electric Research Laboratory on Virtual Reality Technology, Document No. 0272, Nov. 1996, pp. 50-57.

Mojtaba Hosseinii, et al., A Haptic Virtual Environment for Industrial Training, No. 0-7803, 7635; 2002, pp. 25-30.

Jim Purbrick, et al., An Extensible Event-based Infrastructure for Network Virtual Worlds, Proceedings of the IEEE Virtual Reality 2002 (VR' 02).

Pedro Ferreira, et al.,Security and Privacy in a Middleware for Large Scale Mobile and Pervasive Augmented Reality.

C. Santos, et al., Interactive Systems, Design, Specification and Verification , International Workshop, 10th, Jun. 11-13, 2003 DSV-IS 2003 Revised Papers (Lecture Notes in Computer Science, vol. 2844), pp. 410-414.

Matthew Lewis, et al., Interactively Evolving Environment Maps with Continuous Layered Pattern Functions, Advanced Computing Center for the Arts and Design, The Ohio State University, pp. 1-12.

Gurminder Singh, et al., Networked Virtual Worlds, Institute of Systems Science. National University of Singapore, Document No. 0-8186-7062, 1995, pp. 44-49.

Tom Chen, et al., On Integrated Multi-Sensory Components in Virtual Environments, pp. 1-6.

Dr. John Robinson, et al., MVIP-II: A Protocol for Enabling Communication on Collaborative Virtual Environments, pp. 155-160.

Michael E. Papka, et al., Mathematics and Computer Science Division, pp. 306-307.

Richard M. Satava, et al., An Integrated Medical Virtual Reality Program, Mar. /Apr. 1996, pp. 94-104.

Horoyuki Tarumi, et al., Department of Social Informatics, Graduate School Informatics.

Tomohiro Tanikawa, et al., Proceedings of the International Symposium on Mixed and Augmented Reality (ISMAR'02).

Xiaojun Shen, et al., "A Heterogeneous Scalable Architecture for Collaborative Haptics Environments," 2003.

Jeremie Allard, et al., "FlowVR: A Middleware for Large Scale Virtual Reality Applications," 2004.

Qingping Lin, et al., "Addressing Scalability Issues in Large-Scale Collaborative Virtual Environment," 2006.

Pandzic et al., "A flexible architecture for Virtual Humans in Networked Collaborative Virtual Environments", 1997, pp. 1-15.

Purbrick et al., "An Extensible Event-based Infrastructure for Networked Virtual Worlds", 2002, pp. 1-7.

McNett et al., "Usher: An Extensible Framework for Managing Clusters of Virtual Machines", 2007, pp. 1-25.

Tran et al., "An Open Middleware for Large-scale Networked Virtual Environments", 2002, pp. 1-8.

Explicit Conversion of Base Class to Derived Class, Microsoft Developer Network, May 2007, pp. 1-11.

Wikipedia, "Universally Unique Identifier", [online], [Retrieved on Sep. 26, 2016]. Retrieved from the Internet at <URL: https://en.wikipedia.org/wiki/Universally_unique_identifier>, page last modified on Sep. 18, 2016, Total 6 pp.

* cited by examiner

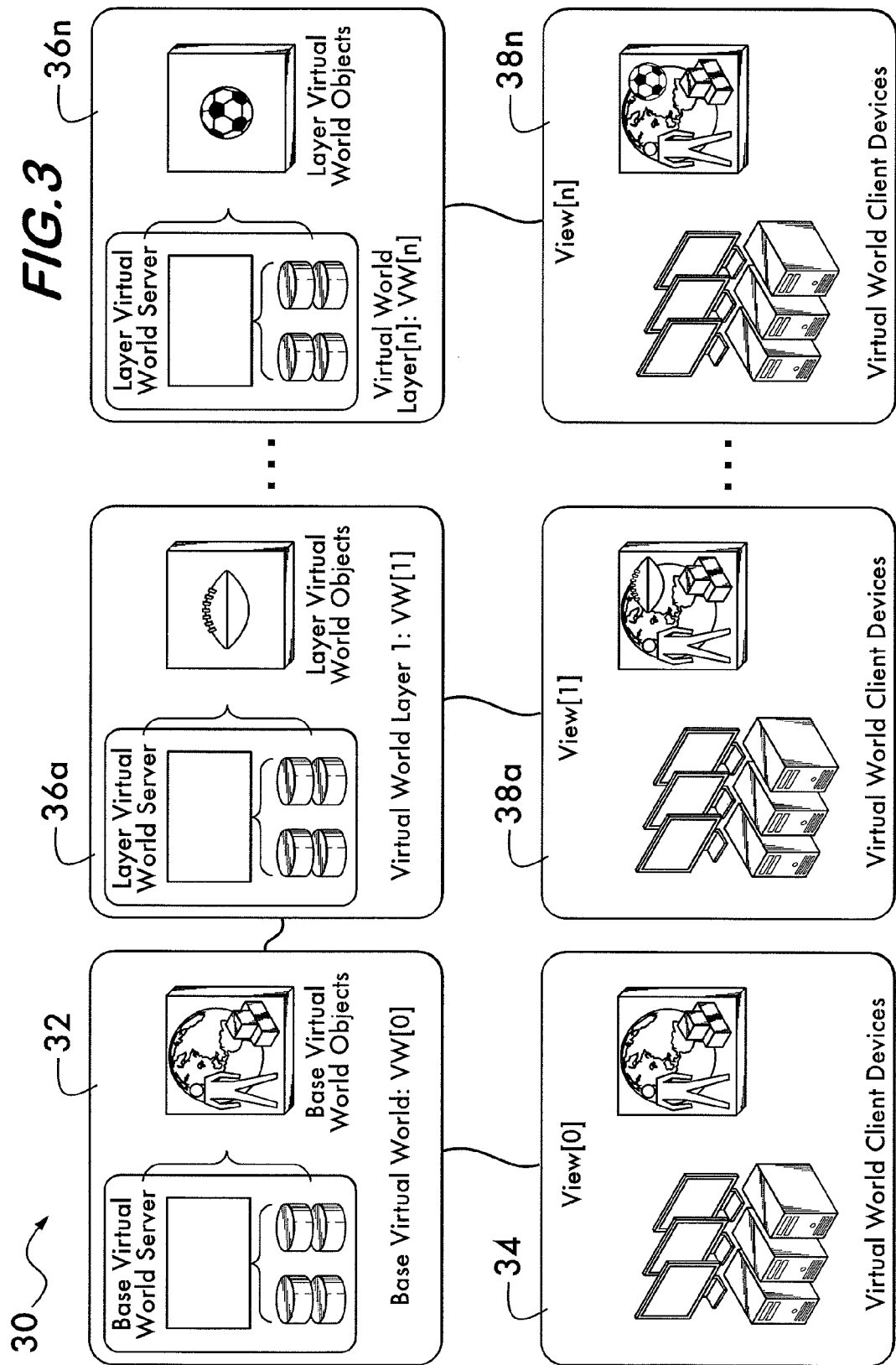

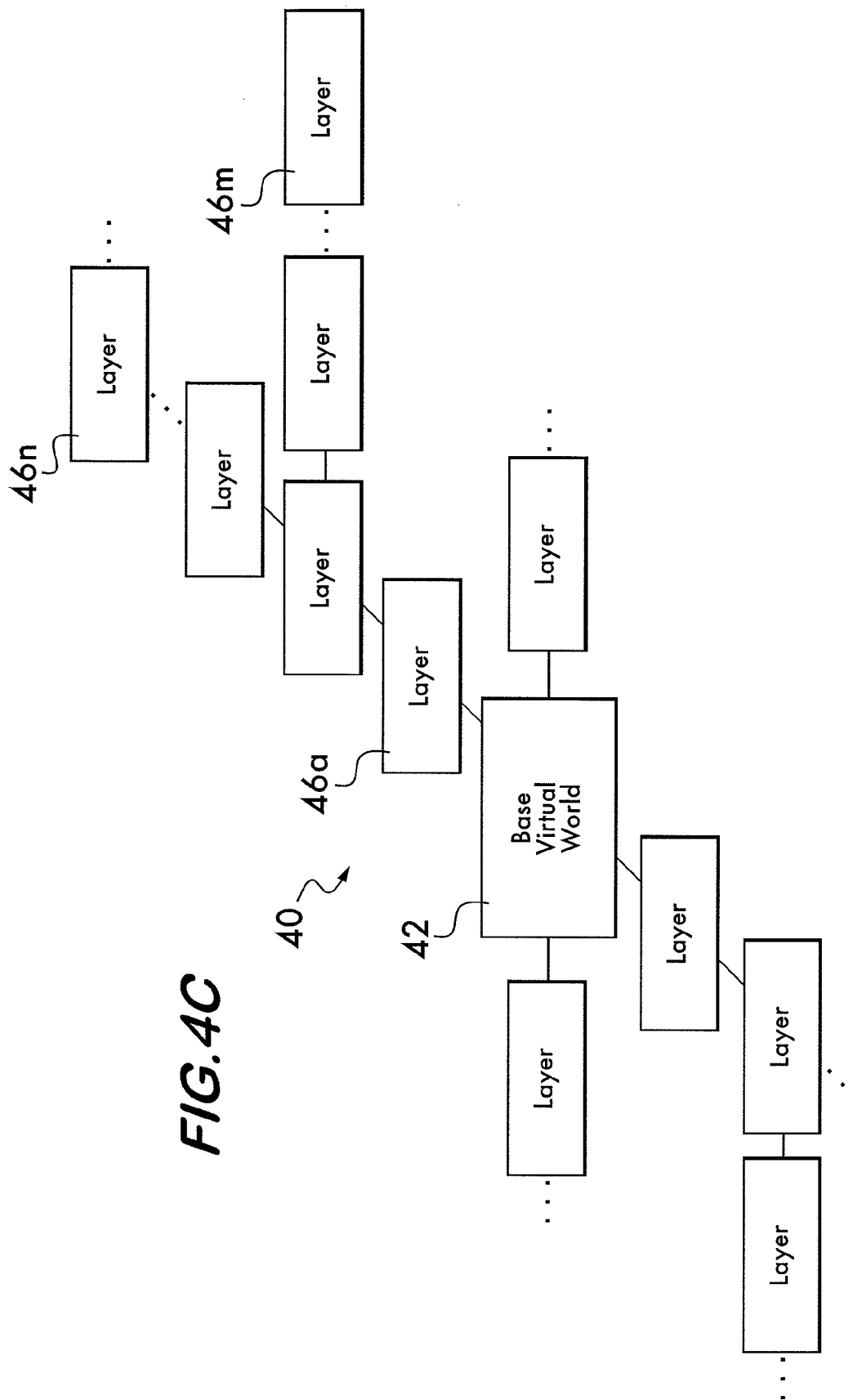

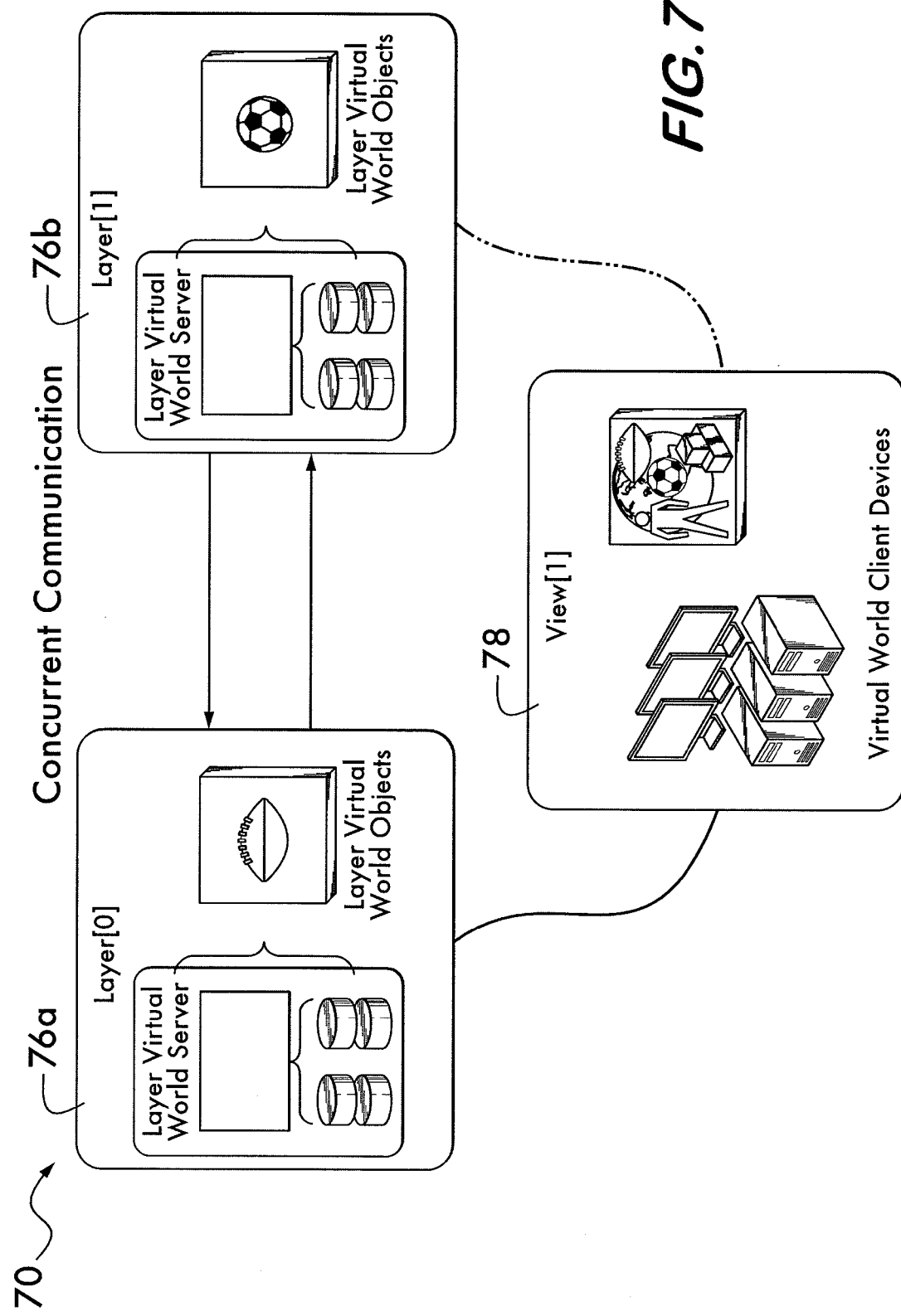

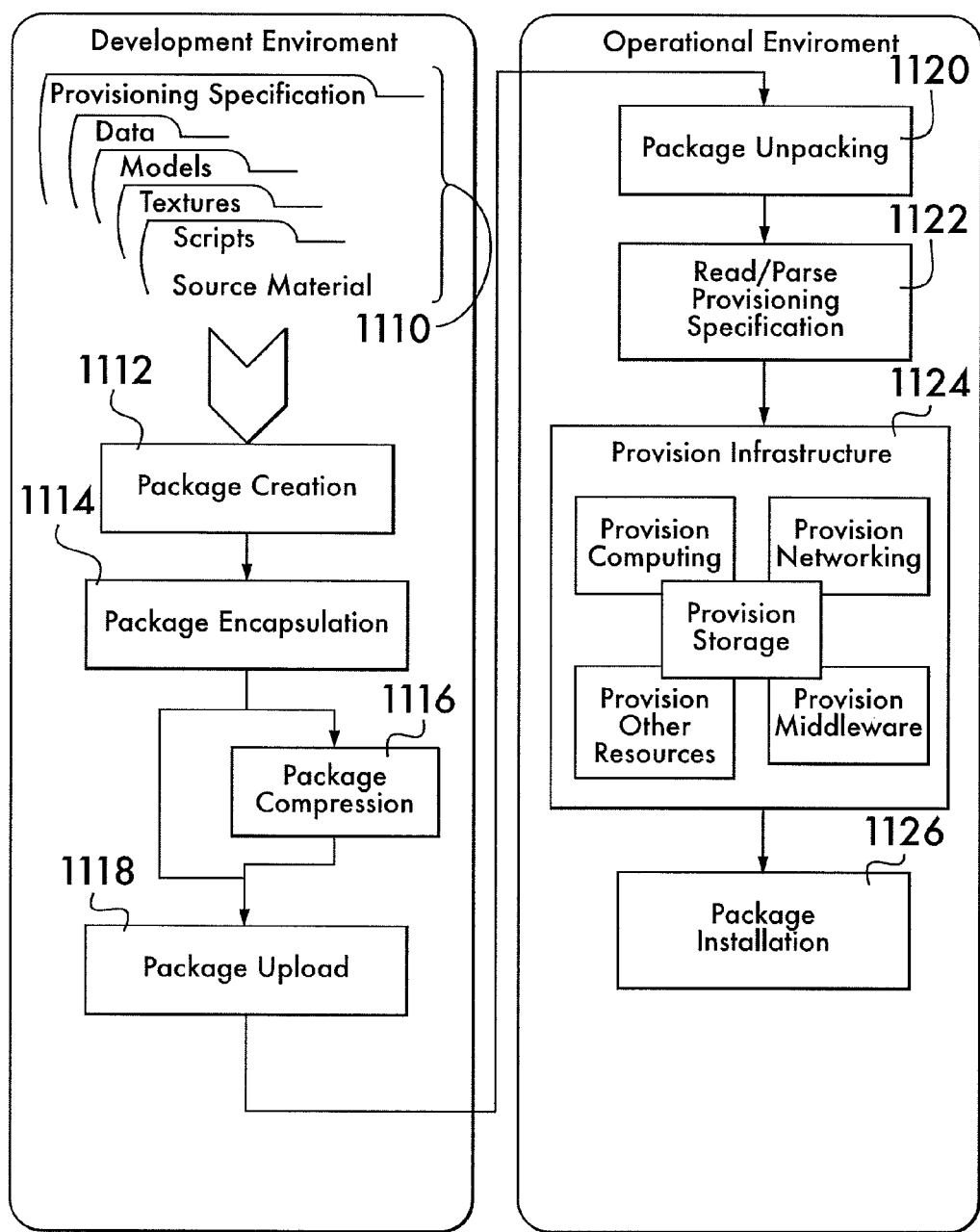

METHOD FOR PROVIDING A VIRTUAL WORLD LAYER

BACKGROUND

This invention relates generally to field of virtual worlds and more particularly to the development, use and operation of a virtual world.

A virtual world is a computer-base simulated environment intended for its residents to traverse, inhabit and interact, often through the use of avatars. An avatar is a graphical element selected by a user of a system that other users can see and which represents the user. Avatars often take the form of cartoon-like humans, but any other graphical or non graphical representation is possible. For example, an avatar may be a static image, a computer-generated animation or a point of view not perceivable to other participants in the virtual world. Users or residents of a virtual world can interact through their avatars using a myriad of communication and collaboration technologies including, but not limited to, known chat-room technology. For example, to mimic the behavior of real life human interactions, when an avatar speaks a text window can appear on the user interface of the other users whose avatars are within hearing range of the speaking avatar using known chat-room technology. Audio can be used to convey speech, or virtual objects can be used to convey meanings that can not be expressed with spoken or written language.

Other important virtual world concepts include agents and regions. An agent is a user account, upon which the user can build an avatar. The agent is associated with an inventory of assets the user can own. A region is a three dimensional virtual area of land within a virtual world. Assets, avatars, the environment and anything else visual consists of unique identifiers (UUIDs, see http:widipedia.org/wiki/UUID) associated with geometric data (distributed to users as textual coordinates, lists of polygons or lists of vectors, for example), textures (distributed to users as graphics files such as JPEG2000 files), and effects data (rendered by the user's client according to user preferences and user device capabilities.

Many virtual worlds are represented using three dimensional graphics and landscapes, and may be used by many thousands of participants, sometimes known as residents, each having one or more avatars. Residents of a virtual world may traverse and inhabit the virtual world, and interact with one another through the use of those avatars. Other terms for virtual worlds include virtual universes, metaverses, virtual realities, massively multiplayer online games, virtual realms and 3D internet.

Often, virtual worlds resemble the real world in many ways. For example, virtual worlds can resemble the real world as in terms of physics, houses and other buildings, and landscapes. Examples of virtual worlds can include: Second Life, Entropia World, The Sims Online, There, Red Light Center and several massively multiplayer online games such as EverQuest, Ultima Online, Lineage or World of Warcraft.

In many virtual world situations there is a need or desire to add virtual world functionality, virtual world objects, virtual world interactions, and users to an existing virtual world. However, for technical reasons the virtual world content or infrastructure often cannot be easily augmented or expanded. Additionally, in some known virtual world situations a virtual world user population can require segmentation for purposes of security and functionality. Therefore, methods are required to extend functionality and capacity for existing virtual worlds. Furthermore, methods are also needed to segregate user populations within virtual worlds.

One case where extension of functionality can be required is in military virtual world embodiments that require information hiding. The information hiding can be based on security level or levels of clearance. Another example where extension of functionality can be required is providing age appropriate content where adults and children participate in a single virtual world, but only adults may view adult designated content. Other examples can include providing managerial control and objects in worlds in which world managers may see and interact with objects not accessible to the general population participating within the virtual world, and providing a referee view for sports and activities that require officiating. In contests such as sporting events a referee may have a view of objects and object modifications in the virtual world that help officiate, but may otherwise be a distraction to players.

It may be useful to provide modification, editing rights and functionality to a subset of users of a virtual world. Virtual world development and providing secure and cost effective virtual world content creation tools can be a complex task. Thus, an ability to permit virtual world content creation, the addition of new functionality, manipulation in a live virtual world without the need to integrate security, and the tooling directly into the virtual world are useful. This can be cumbersome, expensive, and disruptive.

For example, new functionality and content can be created on an isolated copy of a virtual world, and then migrated to a production copy of the virtual world. This can delay end user involvement and require maintenance of multiple copies of virtual worlds. It can also delay the process of moving functionality from development to production and require disruption of service in the production copy of the virtual world.

Also, managing multiple virtual worlds efficiently and effectively, while separating in-world management functionality is useful. For example, in a virtual world embodiment called Second Life adding functionality to the infrastructure of a specific user population can require modification of the infrastructure itself. Infrastructure modification can be extremely intrusive to virtual world operation, often requiring the entire world or regions within the world to be non-functional for periods of time.

Referring now to FIG. 1, there is shown the prior art virtual world system 10. The prior art virtual world system 10 includes a base virtual world 12 and a base virtual world view 14. The base virtual world 12 can include a virtual world server with disk arrays for storing the source virtual world objects as well understood by those skilled in the art. Known base virtual worlds such as the base virtual world 12 can sometimes be referred to as canonical virtual worlds. Participants in the prior art virtual world system 10 who are interacting with the base virtual world 12 and viewing the base virtual world 12 by way of the base virtual world view 14 can do so by connecting directly to the base virtual world view 14. Within the prior art virtual world system 10 content and functionality are implemented in a single base virtual world 12. All interactions and objects can be preconceived by the developers of the virtual world system 10 and integrated into the single instance of the base virtual world 12.

Two methods for extending capacity and functionality of a virtual world such as the prior art virtual world system 10 are known to those skilled in the art. One method is segregating and extending the functionality through a permissions-based mechanism. Another method is providing community segregation through the creation of independent instances of the virtual world.

Permissions based mechanisms that control functionality and access to objects and areas within a virtual world can require all functionality, access control lists and the user community to be managed by a single virtual world instance. Such a system may require continual updates, and capacity and functionality enhancements to the single virtual world infrastructure. Additionally, a single virtual world instance may be required to manage user and functionality accounting for the virtual world. It may not always be desirable to consolidate information and functionality into a single system for a number of reasons including manageability, upgradeability, and understandability.

The other known method for extending capacity and functionality is community segregation. Community segregation can require creation of a separate and independent copy of the virtual world. This practice can create a completely separate and isolated copy of a virtual world. Such an approach can require a complete copy of a virtual world wherein the isolated virtual world requires the same infrastructure as the original. It is common for this method to be used to enhance capacity. Each independent copy can manage and provide functionality for its population base without leveraging existing virtual worlds. Such a method can require inefficient duplication of resources, and a change to the original virtual world must be copied to all derived virtual worlds.

SUMMARY

A method for providing virtual world functionality, to a user of a base virtual world having base virtual world functionality includes providing a virtual world layer having virtual world layer functionality beyond the base virtual world functionality, coupling the virtual world layer to the base virtual world, and coupling the virtual world layer to the user. The method also includes providing user access to the base virtual world functionality and to the virtual world layer functionality by the virtual world layer. The user access is provided according to a user command and only by way of the virtual world layer. The base virtual world has a base virtual world object and the virtual world layer has a layer virtual world object. Those skilled in the art will understand that, for example, a base virtual world object can be referred to as a base world object for convenience, and a layer virtual world object can be referred to as a layer world object for convenience. A state of the base world object is managed by the base virtual world to provide a base managed object. A state of the layer world object is managed by the virtual world layer to provide a layer managed object. A state of the base managed object is managed by the virtual world layer to provide a further managed object. User access to the layer managed object and to the further managed object is provided by the virtual world layer. User access to the base managed object is provided by the virtual world layer and the further managed object is independent of any instantiation of the base world object in the virtual world layer. The layer managed object is independent of any instantiation of the layer world object in the base virtual world.

A method for providing virtual world functionality to a user includes coupling a first virtual world layer to the base virtual world and coupling second and third virtual world layers to the first virtual world layer. Segregated users get user access to the base virtual world by way of the second virtual world layer and by way of the third virtual world layer. The base virtual world has a base world object and the second virtual world layer has a second layer world object. User access to a base managed object is provided according to a user command. User access is provided only by way of the virtual world layers. A further managed object is independent of any instantiation of the base world object in the virtual world layers. The layer managed object is independent of any instantiation of the layer world object in the base virtual world.

A method for providing virtual world functionality to a user of a base virtual world having base virtual world functionality and a list of base virtual world users includes providing a virtual world layer, communicating to the base virtual world that the virtual world layer will overlay the base virtual world, and adding the virtual world layer to the list of base virtual world users in order to register the virtual world layer with the base virtual world. A base world functionality to be augmented by the virtual world layer is communicated to the base virtual world. The virtual world layer has a registration list of virtual world layer users and the base virtual world is added to the list of virtual world layer users. The base virtual world functionality is executed by way of the virtual world layer.

The virtual world layer has virtual world layer functionality beyond the base virtual world functionality and a virtual world layer user community. The virtual world layer is coupled to the virtual world layer user community. The virtual world layer user community is provided with access to the base virtual world functionality and the virtual world layer functionality by the virtual world layer. The base virtual world and the virtual world layer each have a respective user community and the user communities are segregated. The base virtual world has base world objects and the virtual world layer notifies the base virtual world which base world objects the virtual world layer will use to provide used base world objects. The used base world objects are managed by the virtual world layer to provide world managed base objects. For example, a texture of the virtual world managed base objects is altered.

A method for providing virtual world functionality to a user of a base virtual world having base virtual world functionality includes providing a virtual world layer having virtual world layer functionality beyond the base virtual world functionality, encapsulating the virtual world layer to provide a virtual world module, transmitting the virtual world module to virtual layer infrastructure to provide a transmitted virtual world module, and executing the transmitted virtual world module to provide user access to the base virtual world functionality and the virtual world layer functionality. A provisioning specification is provided within the virtual world module. The virtual world layer has virtual world layer infrastructure and the virtual world layer infrastructure is provisioned in accordance with the provisioning specification. Computing equipment is provisioned in accordance with the provisioning specification. Accounting support software within the virtual world module is provisioned in accordance with the provisioning specification. Networking is performed in accordance with the virtual world module. The virtual world module is unpacked to provide an unpacked virtual world module and the unpacked virtual world module is executed. The virtual world module is transmitted by a content creator.

BRIEF DESCRIPTION OF THE SEVERAL VIEWS OF THE DRAWINGS

FIG. 3 is a schematic representation of a multiple layered virtual world system according to an embodiment of the invention.

FIG. 7 is a schematic representation of a further virtual world communication protocol according to an embodiment of the invention.

FIG. 11 is a schematic representation of a virtual world layer package and method according to an embodiment of the invention.

DETAILED DESCRIPTION

Figure 1:
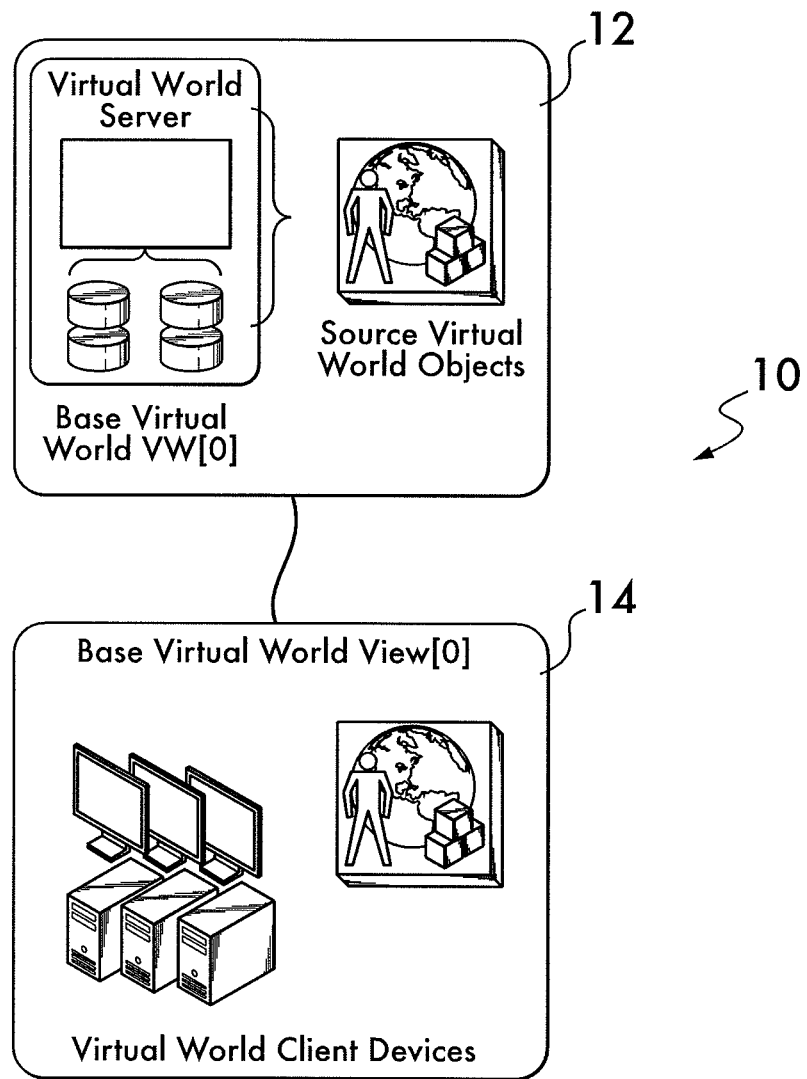
FIG. 1 is a schematic representation of a prior art virtual world system.
Figure 2:
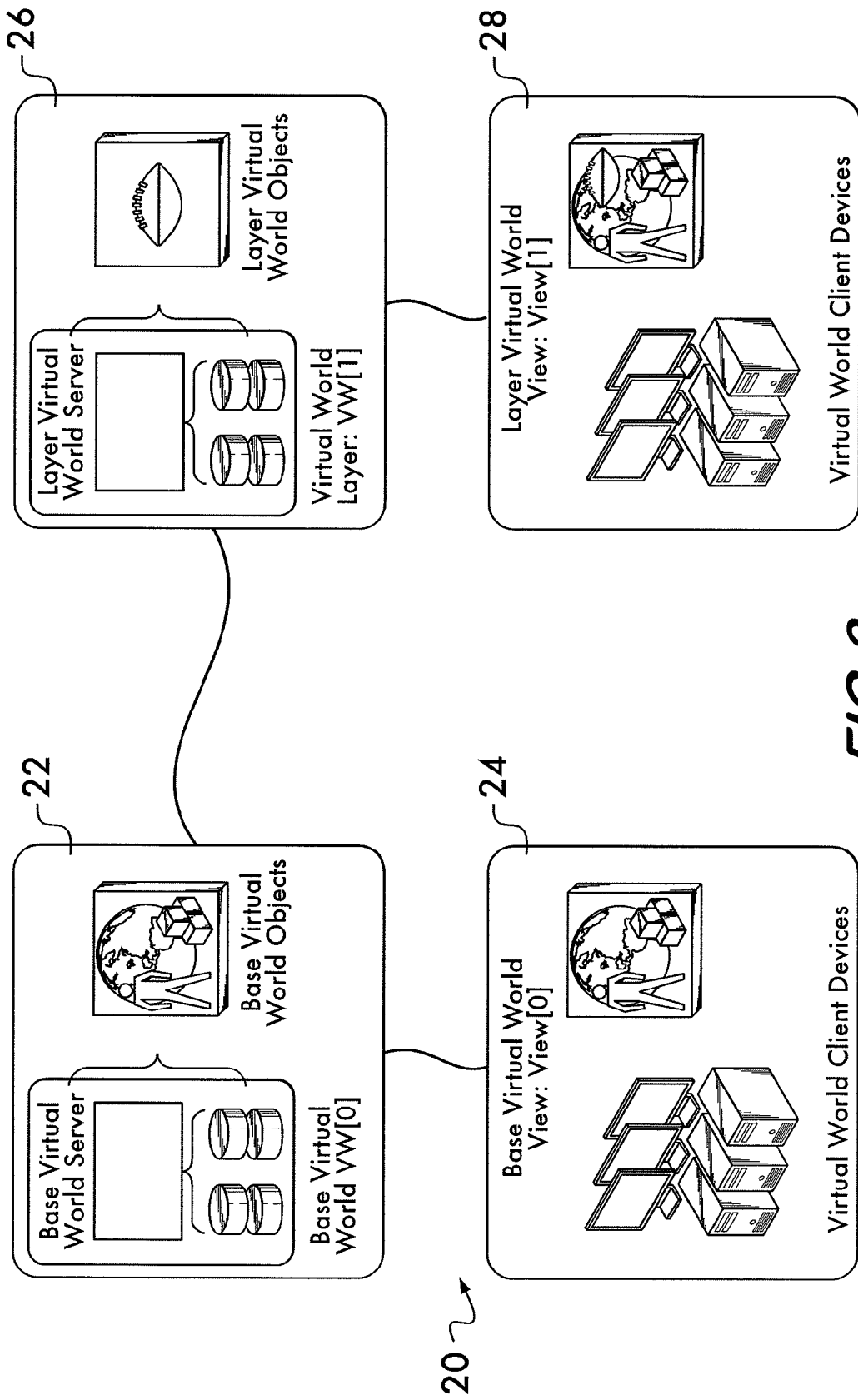
FIG. 2 is a schematic representation of a single layered virtual world system according to an embodiment of the invention.

Referring now to FIG. 2, there is shown the single layered virtual world system 20. The single layered virtual world system 20 can include the base virtual world 22 and the base virtual world view 24. In a manner substantially similar to the manner understood by those skilled in the art with respect to the prior art virtual world system 10, a user community of the single layered virtual world system 20 can connect directly to the base virtual world 22 by way of the base virtual world view 24. Accordingly, the user community can interact with objects whose existence and state the base virtual world 22 maintains by way of the base virtual world view 24. However, according to a preferred embodiment of the invention, the single layered virtual world system 20 can also include a virtual world layer 26 and a layer virtual world view 28. The layer virtual world view 28 can couple directly to the virtual world layer 26, where a coupling between base virtual worlds, virtual world layers and layer virtual world views can be any type of communication or association known by those skilled in the art.

Those skilled in the art can use a virtual world layer order notation VW[0] to represent the base virtual world 22. The virtual world layer order notation VW[1] can represent the virtual world layer 26. Furthermore, the virtual world layer order notation View[0] can represent the base virtual world view 24, and View[1] can represent the layer virtual world view 28. The virtual world layer order notation used herein can be a bracketed notation that is substantially similar to array notations common in many programming languages. In this virtual world layer order notation each bracketed numerical value following a virtual world name or virtual world view name can represent a tier.

The virtual world layer 26 can be a middleware including a layered virtual world server, or multiple servers with disk arrays for storing the source virtual world objects of the layer 26. The layer virtual world server can interact with the base virtual world 22 on behalf of the community of layered virtual world users. Any interaction of the virtual world layer 26 that affects the base virtual world 22 can pass through the virtual world layer 26 to the base virtual world 22. Participants in the single layered virtual world system 20 who are not using the layer virtual world view 28 can interact with the base virtual world 22 by connecting directly to it, for example directly using the base virtual world view 24. The single layered virtual world system 20 is inherently secure since the layer objects within the virtual world layer 26 do not exist in the base virtual world 22. The only way participants of the virtual world layer 26 can interact with the layer objects is by accessing the layered virtual world server within the virtual world layer 26.

The user community viewing the layer virtual world view 28 receives the enhanced functionality provided by the virtual world layer 26 including access to additional objects stored by its server by issuing commands to the virtual world layer 26. Furthermore, access to the additional objects can be exclusive to the user community viewing the layer virtual world view 28. The server within the virtual world layer 26 communicates with the base virtual world 22 to retrieve states, objects, textures, scripts, etc. However, the virtual world layer 26 can manage the state and persistence of its own objects and their relation and interaction with the objects of the base virtual world 22.

Furthermore, the virtual world layer 26 can manage its own separate list of users. Clients of the virtual world layer 26, such as the layer virtual world view 28, may render and interact with all of the objects found in the base virtual world 22, but they may also interact with all of the objects stored in the virtual world layer 26. The single layer virtual world view 24 thus enables user access to objects that do not exist in the base virtual world 22. For example, in the embodiment shown in FIG. 2, the virtual world layer 26 includes a football object which is not present in the objects of the base virtual world 22. The football object is shown added to the objects from the base virtual world 22 when viewed from the layer virtual world view 28.

In one preferred embodiment the layer virtual world view 28 may also provide additional interaction with objects managed in the base virtual world 22. For example, virtual world designers may not want to permit the general population of the base virtual world 22 to change or delete objects in the base virtual world 22. Such actions may be permitted for users of the layer virtual world view 28, and only the user community interacting with the world through single layer virtual world view 28 may have the ability to change and delete functionality.

Accordingly, the use of a virtual world layer package including the single layered virtual world system 20 can extend the functionality and capacity of the existing base virtual world 22, while minimizing the impact and the demand on the base virtual world 22. The layer packages can be used to customize a base virtual world infrastructure without requiring the creator of the customized world to build or maintain a computational infrastructure to support the virtual world. The packages can contain objects, textures, scripts, etc. that describe a virtual world. The packages may describe a complete virtual world or may override only specific items of the base virtual world where the designers deploy them.

The single layered virtual world system 20 or single layered virtual world method 20 can enable an extension of the base virtual world 22 through the implementation of one or more virtual world infrastructures. The virtual world infrastructures can include the layered virtual world server that can act as a proxy between the user and the base virtual world 22 being extended. The layered virtual worlds or proxy virtual worlds can add functionality to the base virtual world 22 by implementing functionality present only on their infrastructure, and managing objects and users that are not part of, or exposed to, the base virtual world 22 or its users. The management of their own virtual world objects by the virtual world layers is in addition to any managing of the base world objects being passed through the layers from the base virtual world 22 to the user community of the virtual world layers.

In a typical virtual world environment such as the prior art virtual world 10 all participants connect to an instance of the virtual world. All participants interact with the same objects. However, within the single layered virtual world system 20 different user communities can have different interactions with the base virtual world 22 mediated by their different virtual world layers 26. Thus, the additional virtual world servers may layer objects and functionality upon the objects and functionality provided by the base virtual world 22. The layered, isolated and differentiated virtual worlds may thus support complementary communities and provide a solution to a number of problems afflicting the development and operation of virtual worlds. Furthermore, the single layered virtual world system 20 permits segregation of user communities whereby the base virtual world 22 does not require knowledge of the users on the single layered virtual world system 20.

An important advantage of the single layered virtual world system 20 is that it can leverage the functionalities of the base virtual world 22 while requiring only enough infrastructures to support its own functionality and its own user community. For example, a layer such as the single layered virtual world system 20 can be designed to tint all of the buildings or selected buildings in a base virtual world a predetermined color. It can be designed to operate selectively on objects provided by the base virtual world according to any parameters or data. For example, a layer can be designed to operate on objects according to global positioning system data that may be associated with the base virtual world objects. In another alternate embodiment objects can be provided with receptor sites for associating images or video or other objects with the receptor sites. For example, the layer can cause images or video to be displayed upon a rendering of an object at the receptor sites of the object.

Participants are users of a virtual world who can interact with augmentations to the base virtual world by connecting exclusively to a layered virtual world server which manage the additional objects not visible or accessible by users of the base virtual world 22. In order to do this its infrastructure communicates with the base virtual world 22 and one or more virtual world clients. Furthermore, single layered virtual world system 20 enables its users to interact with the users of the base virtual world 22 while providing complete segregation between the user communities.

Referring now to FIG. 3, there is shown the multiple layered virtual world system 30. The multiple layered virtual world system 30 includes the base virtual world 32 and the base virtual world view 34. A user community of the base virtual world 32 can connect directly to the base virtual world 32. In a preferred embodiment of the invention, the multiple layered virtual world system 30 can also include any number of virtual world layers 36a-n. Each virtual world layer 36a-n can include its own virtual world server for storing its own source virtual objects, as well as its own virtual world view 38a-n connected to it. For example, in the embodiment shown in FIG. 3, the virtual world layer 36n includes a soccer ball object which is not present in objects in the base virtual world 32. The football object is shown added to the objects from the base virtual world 32 when viewed from the layer virtual world view 38n. This is in addition to the football object added to the objects in the base virtual world 32 when viewed from the layer virtual world view 38a. Thus, the multiple layered virtual world system 30 can support any number n of layers to support any layered security or design criteria. The notation VW[1]-VW[n] can represent the virtual world layers 36a-n, and the notation View[1]-View[n] can represent the virtual world views 38a-n.

The multiple layered virtual world system 30 embodiment permits multiple communities to access a single base virtual world 32 by way of its own virtual world view 38a-n. It is modular and may be extended to as many layers as required. The base virtual world 32 can maintain the lowest common functionality and object states within the multiple layered virtual world system 30, while the virtual world layers 36a-n can provide n additional separate sets of functionality and object states. Each virtual world layer of the virtual world layers 36a-n inherits the functionality of the base virtual world 32 and the functionality of the virtual world layers between the base virtual world 32 and itself. Additionally, each virtual world layer of the virtual world layers 36a-n adds its own additional functionality to the inherited functionalities. Accordingly, each of the virtual world layers 36a-n provides its inherited functionality and its own functionality, to its own distinct user community by way of its own virtual world view.

Figure 4A:
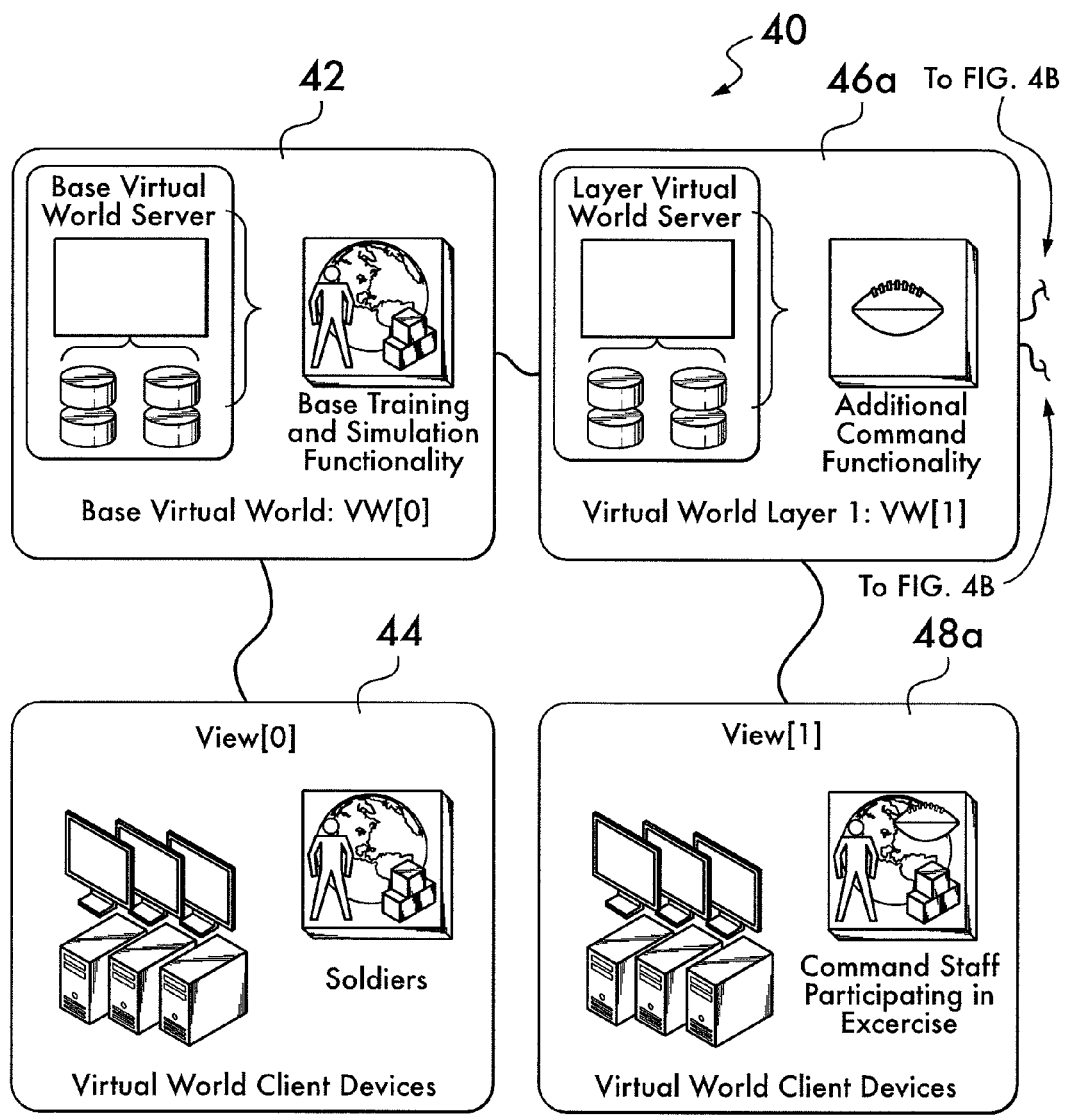
FIGS. 4A, B are partial schematic representations of a parallel multiple layered virtual world system according to an embodiment of the invention.

Referring now to FIGS. 4A,B,C, there are shown schematic representations of the parallel multiple layered virtual world system 40. The parallel multiple layered virtual world system 40 includes the base virtual world 42 and the base virtual world view 44. A virtual world layer 46a is coupled directly to the base virtual world 42. The virtual world layer 46a is in turn coupled to additional virtual world layers extending up to the virtual world layer 46n, as previously described with respect to the multiple layered virtual world system 30, where it will be understood that the suffix n in the reference numeral 46a-n or in the reference numeral 46a-n can be any appropriate integer value. Furthermore, if the suffix a, for example in the reference numeral 46a-n or the reference numeral 46a-n, has a value 1, then it will be understood that the reference numerals 36a-n and 46a-n indicate respective elements ranging from a first element 36a or 46a through to an $n^{th}$ element, for a total of n elements in each case. Each virtual world layer 46a-n can be coupled to its own virtual world view 48a-n, as also previously described with respect to the multiple layered virtual world system 30.

However, according to a preferred embodiment of the invention, the parallel multiple layered virtual world system 40 can also be provided with a further series of virtual world layers. The further series of virtual world layers can be coupled to the virtual world layer 46a and can extend to the virtual world layer 46m. Thus, the reference numeral 46a-m can be understood to indicate a total of m elements, ranging from a first virtual element 46a to an m$^{th}$ element 46m, substantially in a manner as previously described with respect to the reference numeral 46a-n. Furthermore, the string of the virtual world layers 46a-n and the string of the virtual world layers 46a-m will be understood to include a common virtual world layer 46a, which is coupled to the base virtual world 42. Each of the virtual world layers 46a-m in the parallel multiple layered virtual world system 40 can inherit the functionality of the base virtual world and the virtual world layers it is layered upon and provide the inherited functionalities along with its own functionality to a user. Additionally, each virtual world layer 46a-m can be provided with its own virtual world view 48a-m for providing the combined functionalities to its user community. Therefore, a user community in the parallel multiple layered virtual world system 40 can view the base virtual world 42 by way of at least two virtual world layers.

Figure 4B:
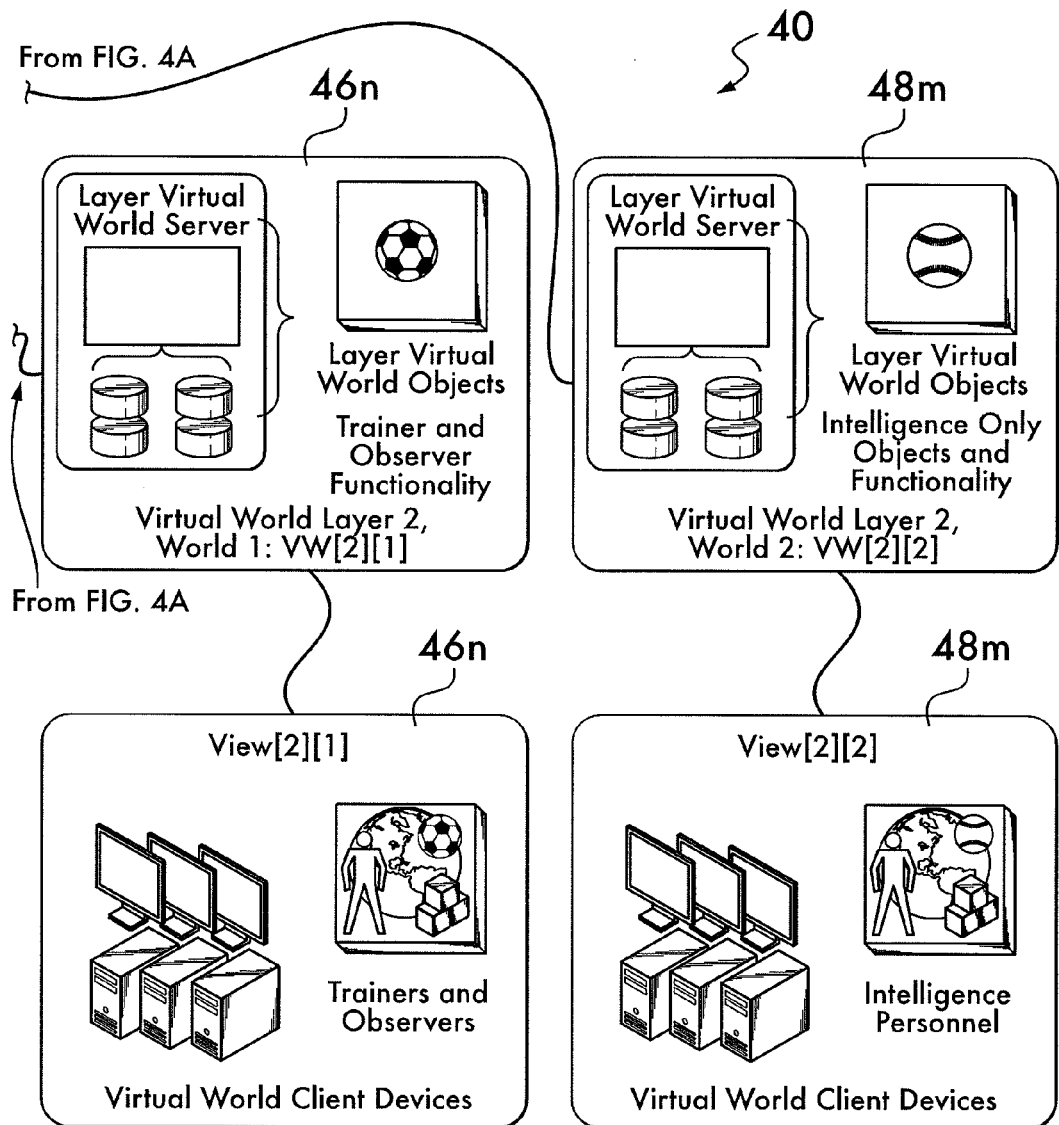
FIG. 4C is an alternate embodiment of the parallel multiple layer virtual world of FIGS. 4A,B.

Furthermore, any number of additional series of layered virtual worlds beyond layered virtual worlds shown and described can be added in parallel to the parallel multiple layered virtual world system 40 in substantially the same manner. The users coupled to a layer of the parallel multiple layered virtual world system 40 can obtain user access to the augmented functionality or the base virtual world 42 by issuing predetermined commands understood by those skilled in the art. Accordingly, FIG. 4B will be understood to be a more generalized representation of the parallel multiple layered virtual world system 40 as shown in FIG. 4A, wherein any configuration of parallel sequences of virtual world layers can be coupled to a base virtual world 42 substantially in the manner of spokes radiating from a hub.

Parallel layered virtual world systems such as the parallel multiple layered virtual world system 40 are believed to be advantageous for supporting user communities with complex management structures. For example, the parallel multiple layered virtual world system 40 can be useful in a simulation containing separate intelligence personnel supporting a training mission. Soldiers in the training scenario may, for example, connect to the base virtual world 42. The immediate superiors of the soldiers could be provided with additional resources and functionality by attaching them to the various virtual world layer 46a-n. Additionally, intelligence teams may attach to a layered virtual world view VW[2][1] that may contain information and functionality above the security clearance of the soldiers, and their immediate superiors. Trainers may connect to a parallel layered view of the parallel multiple layered virtual world system 40, separate and distinct from that of the intelligence team. The virtual world layer VW[2][1] can provide functionality specific to trainers and command personnel that is not appropriate for the individual soldier or intelligence team members. In this scenario it may not be appropriate to layer intelligence functionality on top of command functionality, or vise versa.

An important benefit of the parallel multiple layered virtual world system 40 is thus the ability to provide independent resources for each independently participating team. This allows resources in a virtual world to be budgeted and allocated in a manner mirroring the resources allocated in a complex management structure. It can also allow for as many parallel layers as necessary in any series or parallel relationship in order to support any number of independent communities requiring well defined complete or partial isolation and separation from each other.

Figure 5:
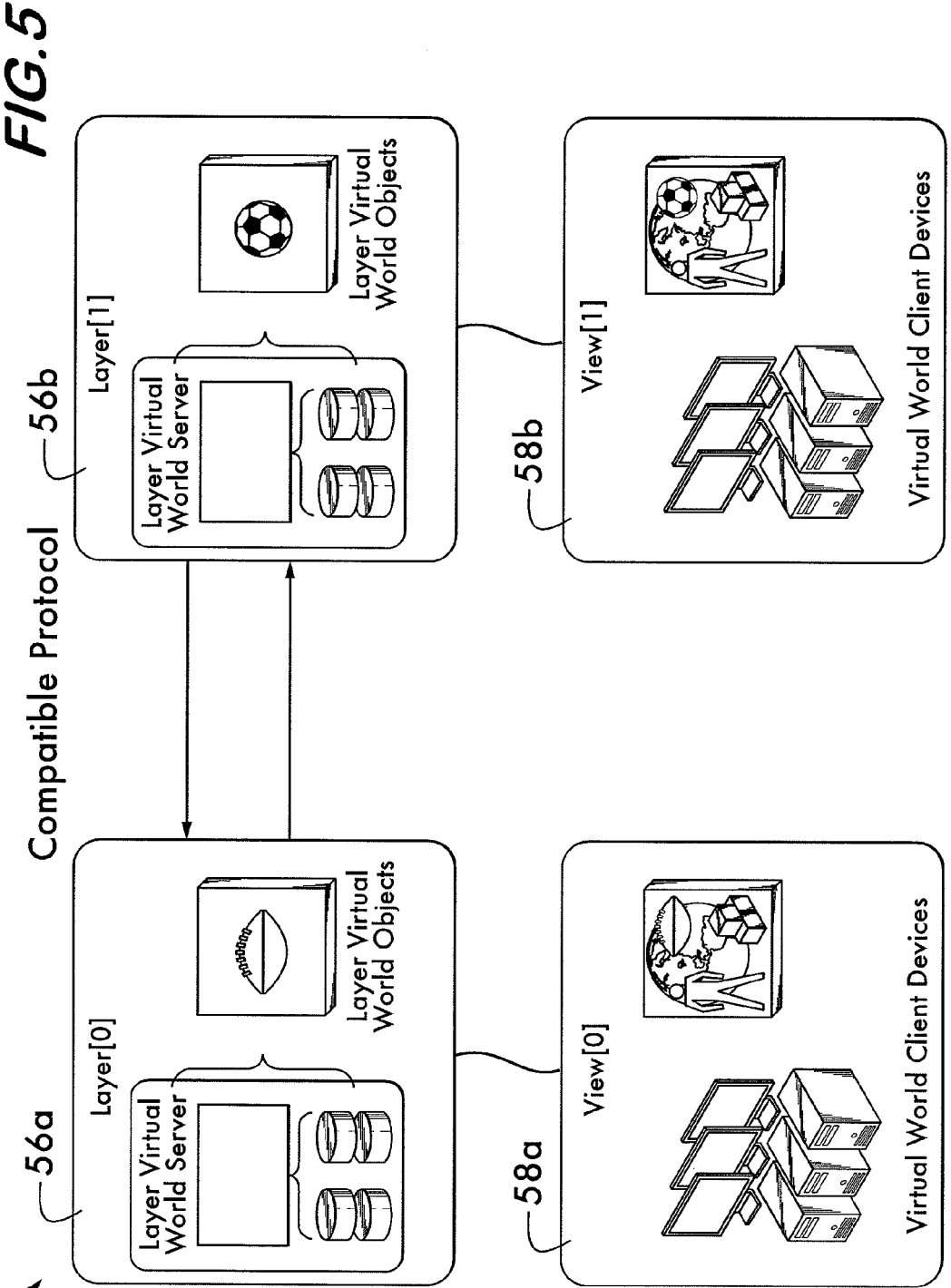
FIG. 5 is a schematic representation of a virtual world communication protocol according to an embodiment of the invention.

Referring now to FIG. 5, there is shown the compatible virtual world communication protocol 50. The compatible virtual world communication protocol 50 can be used with virtual world systems such as the virtual world systems 20, 30, 40 for enabling the virtual world layers 56a,b therein to communicate with a base virtual world, with each other, or with their clients 58a,b. According to the compatible virtual world communication protocol 50, one or both of the virtual world layers 56a,b can use the same communication protocol when communicating with its base virtual world that is uses when communicating with their clients 58a,b. Furthermore, according to a preferred embodiment of the compatible virtual world communication protocol 50, the virtual world layers 56a,b can also use the same communication protocol when communicating with any other base virtual worlds they may be layered upon. This can enable the clients of the virtual world layers 56a,b to alternately connect with the base virtual world, the virtual world layers 56a,b, or the virtual world layer 56b, and easily and directly communicate using the same protocol.

The virtual world layers 56a,b that use the compatible virtual world communication protocol 50 can be any of the virtual world layers of the virtual world systems 20, 30, 40, or any other virtual world systems. The clients 58a,b of the virtual world layers 56a,b using the compatible virtual world communication protocol 50 can be any of the user communities coupled to any of the various virtual world views of the virtual world systems 20, 30, 40, or any other virtual world systems.

Figure 6:
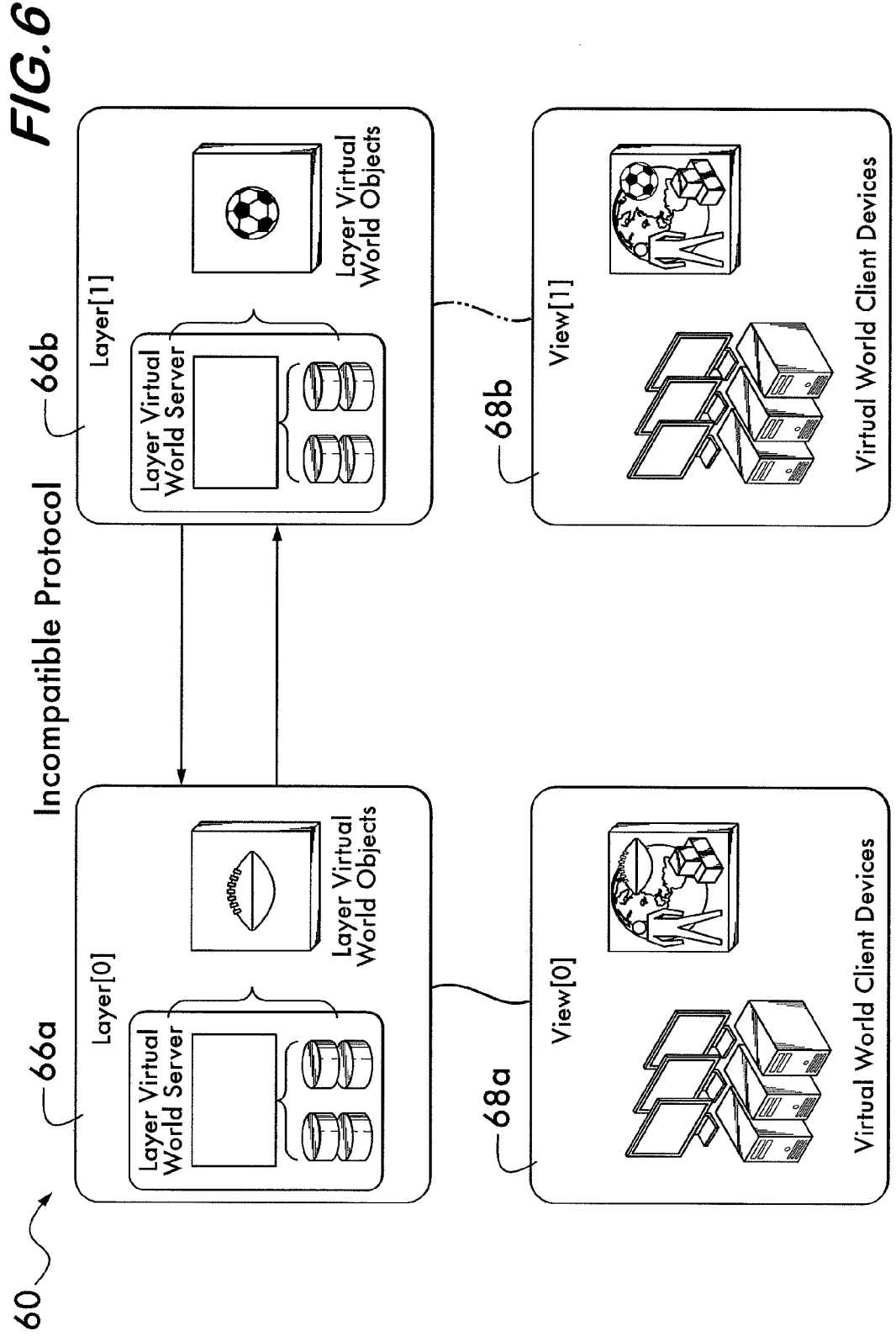
FIG. 6 is a schematic representation of a further virtual world communication protocol according to an embodiment of the invention.

Referring now to FIG. 6, there is shown the incompatible virtual world communication protocol 60. In the incompatible virtual world communication protocol 60, the clients 68a,b of the virtual world layers 66a,b can use a protocol to communicate with its virtual world layer 66a or 66b that is different from the protocol it uses to communicate with its base virtual world. This can occur, for example, where virtual world layers 66a,b add a substantially different functionality that requires a different method of communication between itself and its client 68a,b or 68a,b. According to a preferred embodiment, the virtual world layers 66a,b can use partially different or completely different communication protocols when performing the foregoing communications, especially when they are using the augmented functionality. Furthermore, according to the incompatible virtual world communication protocol 60, the virtual world layers 66a,b can use the same or different communication protocol when communicating with virtual world layers they are layered upon.

The virtual world layers 66a,b that use the incompatible virtual world communication protocol 60 can be any of the virtual world layers of the virtual world systems 20, 30, 40, or any other virtual world systems. The clients 68a,b of the virtual world layers 66a,b using the incompatible virtual world communication protocol 60 can be any of the user communities coupled to any of the various virtual world views of the virtual world systems 20, 30, 40, or any other virtual world systems.

Referring now to FIG. 7, there is shown the concurrent virtual world communication protocol 70. In the concurrent virtual world communication protocol 70 a single client 78 can communicate with both of the virtual world layers 76a,b. Furthermore, in a preferred embodiment, the client 78 can communicate with a single common base virtual world by way of either or both virtual world layers 76a,b. However, it is not necessary for either of the virtual world layers 76a,b to pass all of the functionality of the common base virtual world through to the client 78. Each of the virtual world layers 76a,b can pass a portion of the functionality of the base virtual world to the client 78, although at times a single world layer 76a or 76b can be permitted to pass the entire base virtual world through.

Additionally, each of the virtual world layers 76a,b may augment and enhance the capability of only the portion of the base virtual world it is passing through to the client 78. Furthermore, it is possible for some portion or portions of the functionality of the base virtual world to be passed through to the client 78 by way of one or both of the virtual world layers 76a,b without any augmentation. Additionally, a portion or portions of the base virtual world may be selectively augmented and passed by either of the virtual world layers 76a,b, wherein the portion being selectively passed through can be determined and triggered by any means known to those skilled in the art. Thus, each of the virtual world layers 76a,b, or other virtual world layers in addition to the virtual world layers 76a,b, can provide an independent parallel augmentation of the functionality of the base virtual world to the client 78.

Figure 8A:
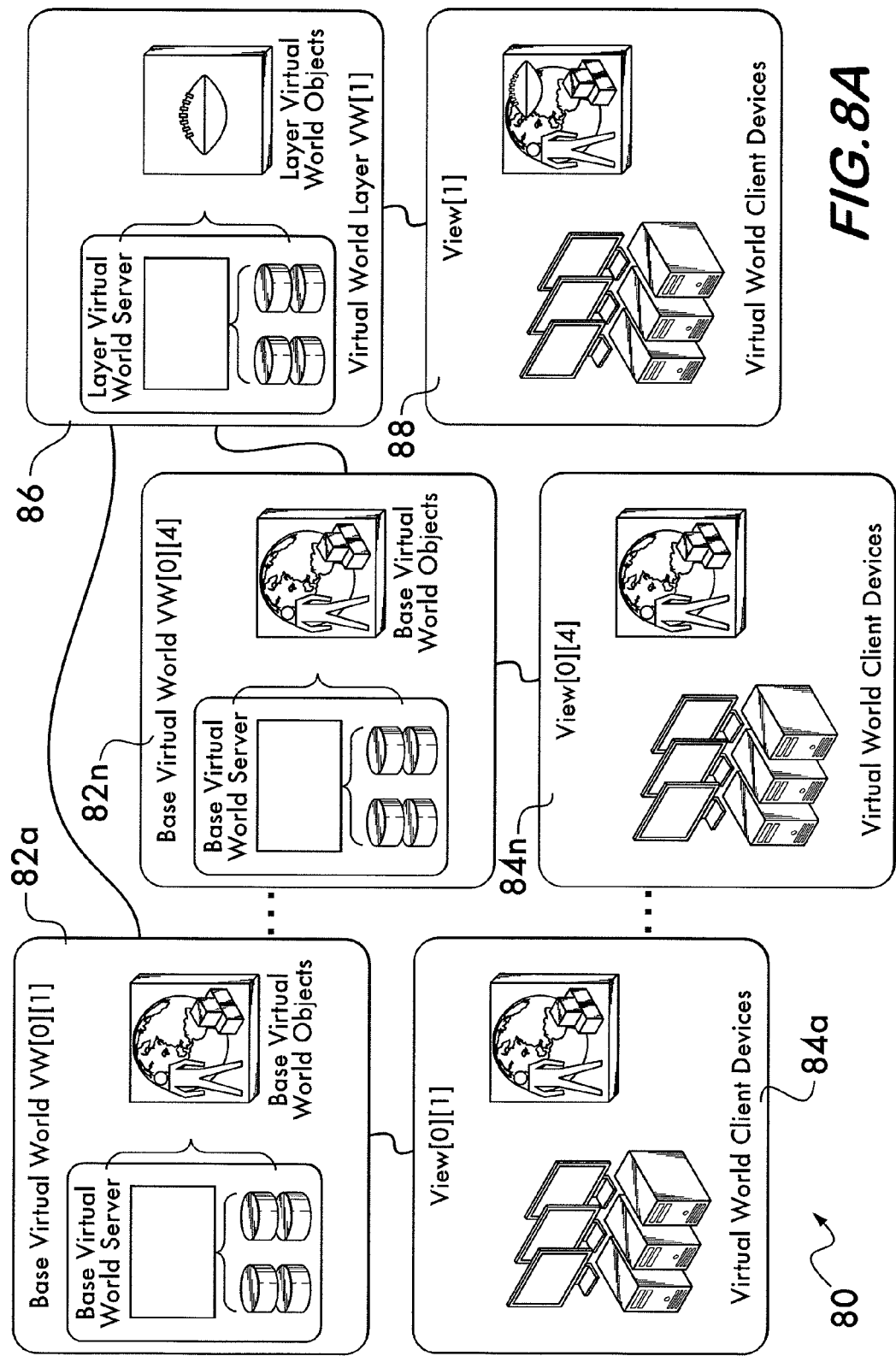
FIG. 8A is a schematic representation of a composite virtual world system according to an embodiment of the invention.

Referring now to FIGS. 8A,B, there are shown schematic representations of the composite virtual world system 80. The composite virtual world system 80 can include any number of base virtual worlds 82a-n. Each base virtual world 82a-n can have its own corresponding virtual world view 84a-n. Additionally, the composite virtual world system 80 can include a virtual world layer 86. The virtual world layer 86 within the composite virtual world system 80 can have its own virtual world view 88. Since the virtual world layer 86 can be layered over any number of the base virtual worlds 82a-n, a user of the composite virtual world system 80 can interact with any of the base virtual worlds 82a-n by way of the virtual world layer 86 and its virtual world view 88. Furthermore, a user of the composite virtual world system 80 can interact with the base virtual worlds 82a-n in substantially the same manner previously described with respect to the base virtual worlds and virtual world views of the virtual world systems or methods 20, 30, 40, or any other virtual world systems or methods. Accordingly, those skilled in the art can also refer to the virtual world layer 86 as the composite virtual world 86.

Thus, one skilled in the art can use the composite virtual world 86 to manage any number of base virtual worlds such as the base virtual worlds 82a-n. The composite virtual world 86 is therefore useful for extending the functionality and capacity of the base virtual worlds 82a-n while minimizing the impact and demand on the base virtual worlds 82a-n being extended, as also previously described. For example, the composite virtual world 86 can enable virtual world extension through the implementation of one or more virtual world infrastructures that can act as proxies between a user of the composite virtual world 86 and the base virtual worlds 82a-n. The proxy virtual worlds created in this manner can select functionality from any of the base virtual worlds 82a-n, and create new virtual worlds that are composites of the selected base virtual worlds 82a-n and the virtual world layer 86.

Figure 8B:
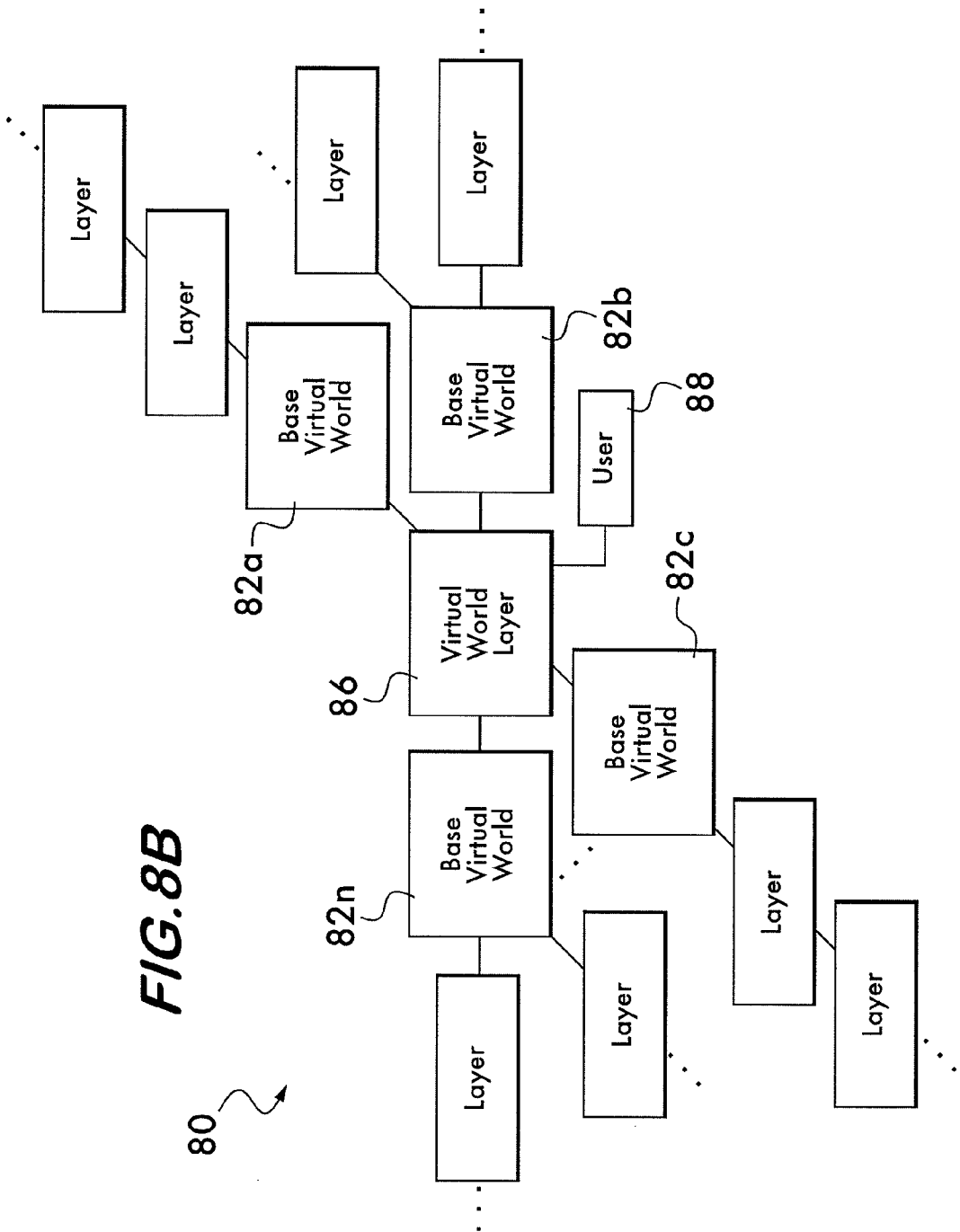
FIG. 8B is a schematic representation of an alternate embodiment of the composite virtual world system of FIG. 8A.

In a typical virtual world environment many participants can connect to a single instance of a virtual world such as the composite virtual world 86. The composite virtual world system 80 thus permits a single user to access multiple base virtual worlds through a single instance of the composite virtual world 86. Additionally, composite virtual world system 80 can create new virtual worlds out of the objects, scripts, textures, etc. that can exist in the other virtual worlds. Creation of a virtual world using a composite proxy such as the composite virtual world 86 permits new virtual world experiences to be created quickly and without the expense of creating a large back-end virtual world processing infrastructure. Furthermore, FIG. 8B will be understood to be a more generalized representation of the composite virtual world system 80 as shown in FIG. 8A, wherein any number of base virtual worlds 82a-n can be coupled to the base virtual world 42. Furthermore, any base virtual world 82a-n of the composite virtual world system 80 can have additional virtual world layers coupled to it.

The composite virtual world system 80 can be advantageously applied to known virtual worlds because it enables the rapid creation of unique virtual world experiences by permitting composition of new virtual worlds from pieces of existing base virtual worlds. Furthermore, the composite virtual world system 80 permits a user to move rapidly between the base virtual worlds 82a-n by way of the composite virtual world 86. Additionally, the composite virtual world system 80 provides a single point of access for monitoring and managing a potentially large domain of virtual world servers. It allows administrative functionality to reside in a secure environment segregated from the domain of the virtual world servers under management.

Figure 9:
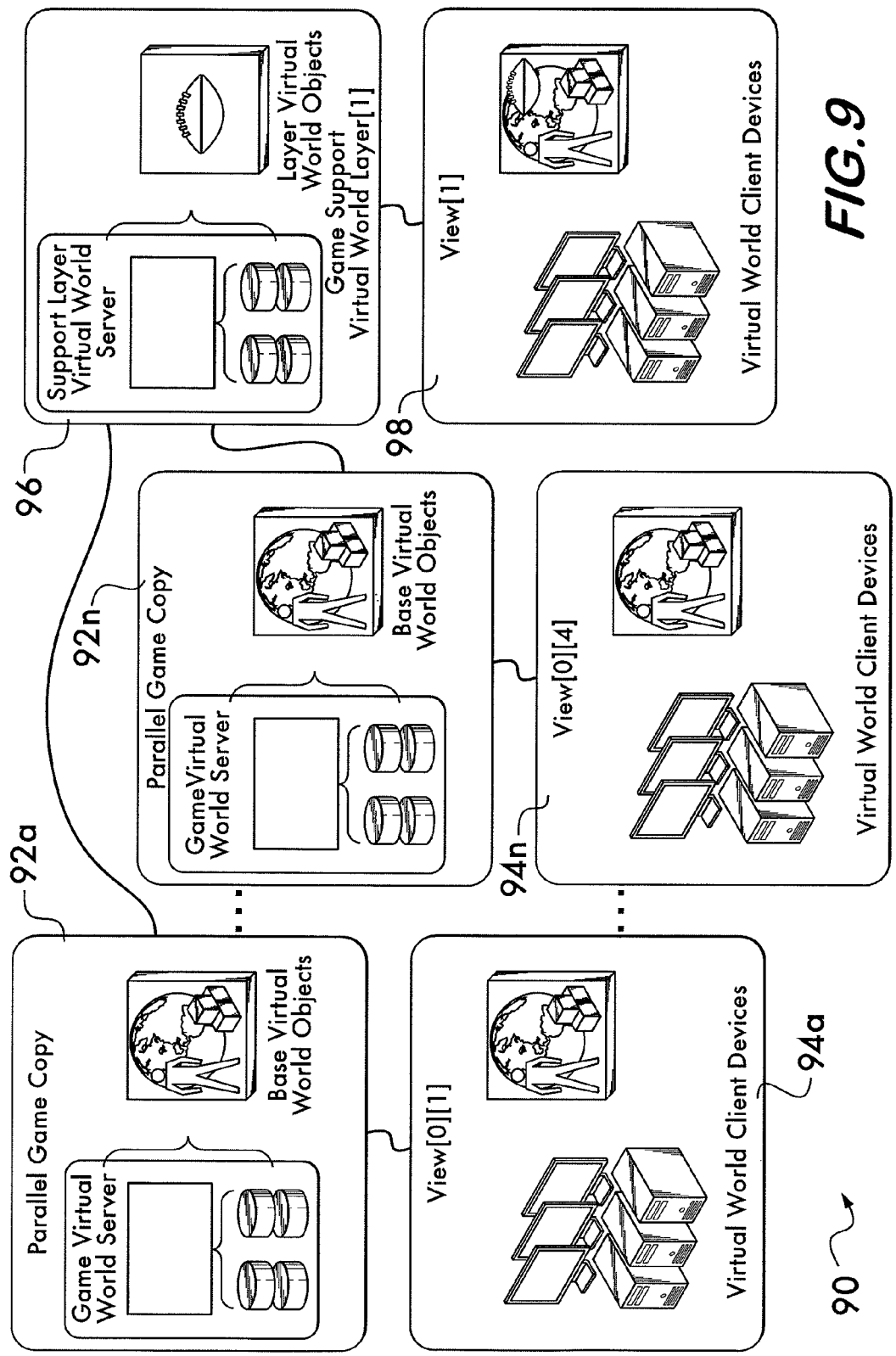
FIG. 9 is a schematic representation of an example composite virtual world system according to an embodiment of the invention.

Referring now to FIG. 9, there is shown the support composite virtual world system 90. The support composite virtual world system 90 can be advantageously applied to the field of virtual world management, for example, within the entertainment industry. In the entertainment market it is common to create several parallel copies of a virtual world, for example game base virtual worlds 92a-n, to support a large and geographically distributed player community. The number of parallel copies can range into the hundreds or higher. Managers of such base game virtual worlds 92a-n in the entertainment industry often give the parallel virtual world copies unique names, so that users can connect to the specific base game virtual world 92a-n they want. In many such virtual world systems, many of the base game virtual worlds 92a-n can share the same or similar static content.

It is known to provide a mechanism for requesting assistance within the virtual world contexts. Due to the independent nature of the segregation methods, many different support requests can arise and exist independently, including within the base game virtual worlds 92a-n. An entertainment company can create a separate support team for each virtual world. However, such an approach can be wasteful and expensive. Customer support in such an environment is difficult because it can be laborious for support personnel to log into multiple virtual worlds simultaneously. Support must be provided in-world for issues that arise within each distinct copy of the virtual world. Support personnel may need the implementation of special support functionality so they can assist customers, and support personnel may need equal access to all parallel copies of the virtual world.

Furthermore, virtual world functionality implemented for support personnel can be a target for mischievous security exploits. Therefore, support functionality can be a security risk if implemented in the base virtual worlds. Furthermore, independent parallel copies of a virtual world require support personnel to log off one copy of the virtual world and log on to another. This is a time consuming and therefore expensive task that reduces the ability of the support personnel to assist customers.

The support composite virtual world system 90 can solve many of these and other problems by creating a composite virtual world 96 for the support personnel to permit easy working access to all of the game base virtual worlds 92a-n by way of the composite virtual world 96. In another embodiment of the invention plural composite virtual worlds 96 can be provided for providing working access to the game virtual worlds 92*a-n* for the support personnel by way of plural paths. Furthermore, the support composite virtual world 96 created in this manner can expose the support functionally to only selected authorized personnel while connecting to all of the game base virtual worlds 92*a-n*.

Therefore, an entertainment company can use standard segregation methods to support a large user population, the segregation method can require the entertainment company to create several identical copies of the virtual world, and the user population can be divided amongst the copies. In order to support the customer base efficiently the entertainment company can create a single or multiple layer composite virtual world 96 to provide specific segregated support functionality. The composite virtual world 96 can be accessible only to support personnel. The virtual world support layer 96 can maintain concurrent persistent communications with all of the virtual world instances. When a customer submits a support request, the layered virtual world 96 can create a support request object that can be activated by the support personnel. The support request object can be created within the virtual world layer 96, and can consist of the support request data provided by the customer, and information to identify which specific virtual world instance 92*a-n* originated the request.

The support composite virtual world system 90 can represent the support request to the support personnel as a virtual world object or as a virtual world menu item. The support personnel can activate the request object, and the layer forming the composite virtual world 96 can provide access to the customer objects. Because each copy of the base virtual world 92*a-n* can be almost identical, only unique data specific to the requesting customer may need to be accessed by the support layer 96. All actions taken by the support personnel on behalf of the customer can be reflected back to the customer specific instance of the base virtual world 92*a-n* through known communications methods. Thus, in virtual world layer order notation, a support request can be made by a customer of VW[0][1]. The support personnel can activate the request object. The support personnel can be allowed to see to the customers virtual world objects. Actions taken in the virtual world are pushed down to the specific VWS[0][1].

The description of the composite virtual world systems 80, 90 can be applied to the management of multiple virtual worlds such as the base virtual worlds 82*a-n*, 92*a-n* that can be substantially similar to each other. However, layered composite worlds such as the composite virtual world systems 80, 90 can also be used to compose new virtual worlds from disparate previously existing base virtual worlds. Such a use can select scripts, textures, objects, avatars, etc. from different base virtual worlds and create a new layered composite virtual world from the selected base world objects. These embodiments may normalize the physics engines for all base virtual worlds, such that objects from one base world could interact with users in the same manner as objects from another base world. Such a composite virtual world need not proxy interactions back to the base virtual worlds. Rather, in an alternate embodiment it could process interactions internally. The composite world embodiments created in this manner enable the rapid creation of new virtual worlds using objects, scripts, textures, etc. from other base virtual worlds.

Figure 10A:
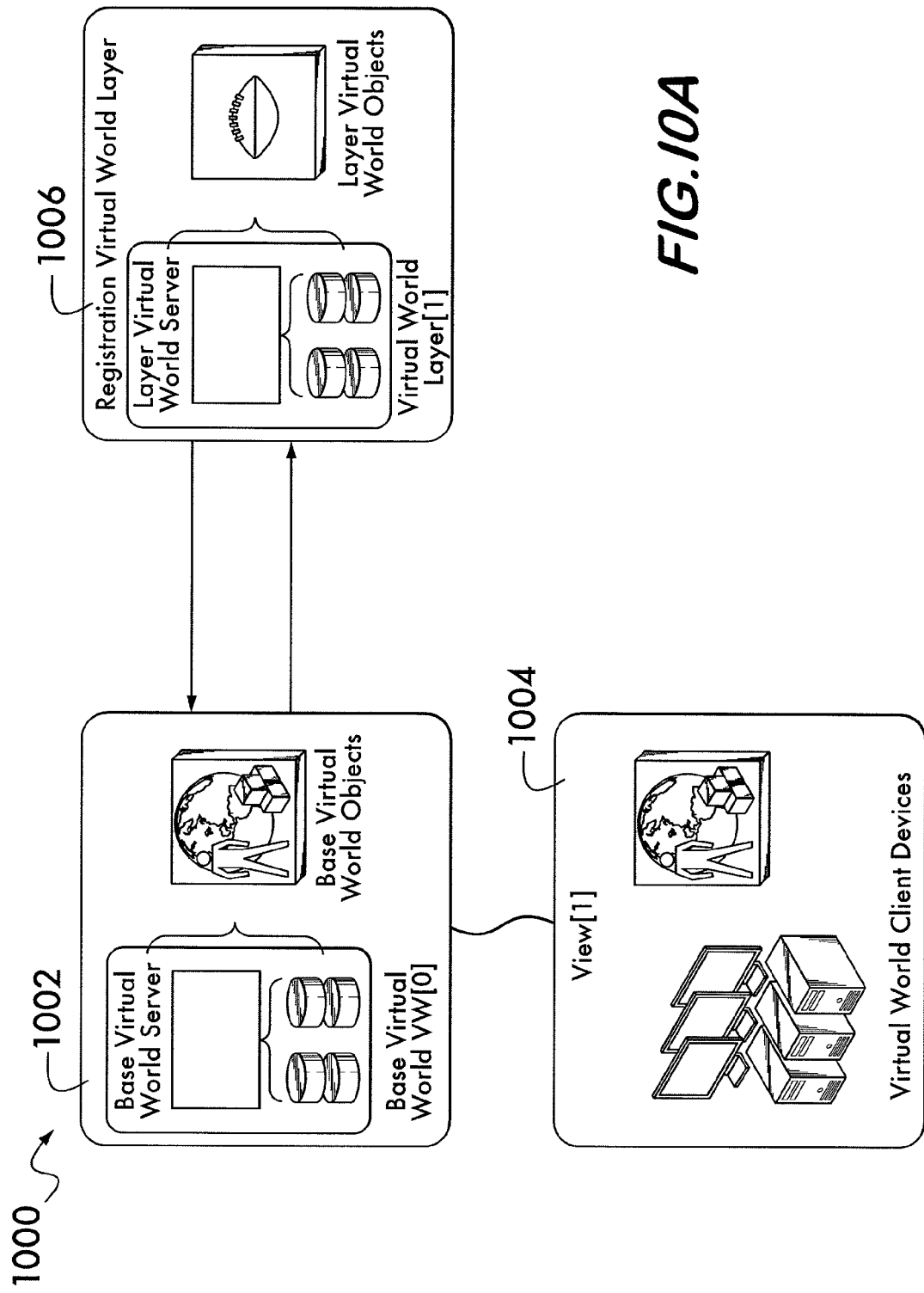
FIG. 10A is a schematic representation of a virtual world registration configuration according to an embodiment of the invention.
Figure 10B:
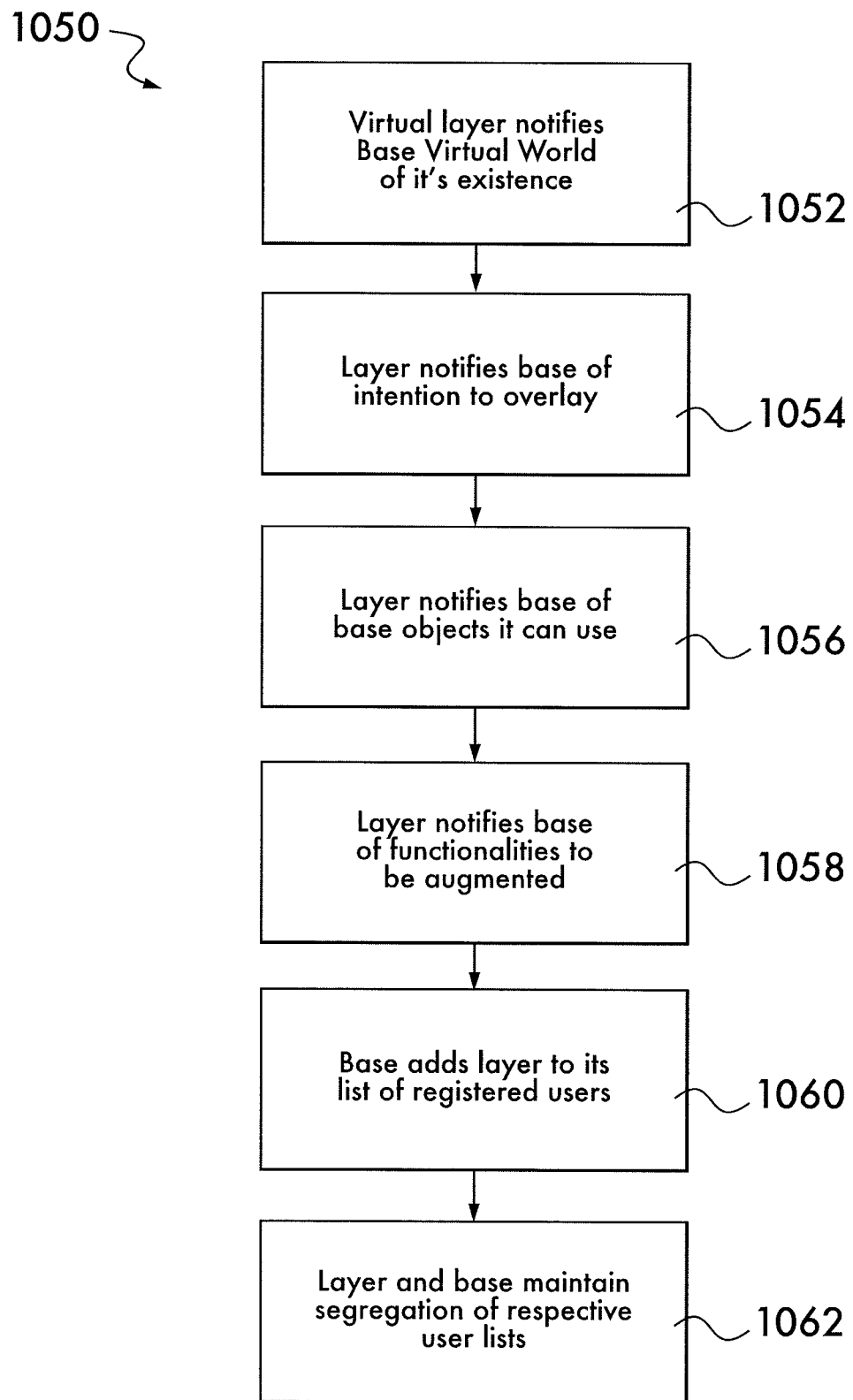
FIG. 10B is a process flow representation of a virtual world registration process according to an embodiment of the invention.

Referring now to FIGS. 10A,B, there are shown the virtual world registration configuration 1000 and the virtual world registration process 1050. The virtual world registration configuration 1000 can include the base virtual world 1002, a registration virtual world layer 1006, and a base virtual world view 1004. In the preferred embodiment of the invention, the registration virtual world layer 1006 and the base virtual world view 1004 can be coupled directly to the base virtual world 1002.

The registration virtual world layer 1006 can be used to make different virtual world software applications aware of each other and to enable them to add each other to their registration lists. In one preferred embodiment the registration list of a virtual world layer can include all of the users in its user community as well as any other virtual world layers it is coupled to, for example any base virtual worlds or any other virtual world layers it is coupled to. The registration list of a base virtual world can include all of the users in its user community as well as any virtual world layers it is coupled to. The registration process of the invention can be used when a new virtual world layer, such as a virtual world layer adding functionality or capability to a base virtual world, is about to be applied to the base virtual world. Under these circumstances a virtual world layer to be added can notify the base virtual world of it existence and that it is about to be applied. Additionally, it can notify the base virtual world what data, objects, etc. it can use or make available. The data, objects, etc. within the base that will be used by the virtual world layer can be referred to as the used data, used objects, etc. Furthermore, the virtual world layer must enable all of the layering operations previously described.

The virtual world registration configuration 1000 thus permits extending the functionality and capacity of existing virtual worlds such as the base virtual world 1002 while minimizing the impact and demand on the virtual world being extended. It enables the extension of the base virtual world 1002 through the implementation of one or more virtual world infrastructures that can register with the base virtual world 1002 and describe the objects and functions it can provide to the base virtual world server. The registered extensions can add functionality to the base virtual world 1002 through implementing the new functionality and managing objects and users that are not part of, or exposed to, the base virtual world 1002, or the users of the base virtual world 1002.

In many virtual world environments when the participants connect to an instance of a base virtual world such as the base virtual world 1002 they can all interact with the same objects, the objects of the base virtual world 1002. The virtual world registration configuration 1000 permits differing user communities to register and have different interactions in the one base virtual world 1002 by way of the registration virtual world layer 1006. Additional virtual world servers may also register with the base virtual world 1002 and provide functionality on top of that provided by the base virtual world 1002 in a similar manner. The registered world layers can be isolated and differentiated virtual worlds. They may support complementary communities and provide a solution to a number of problems afflicting the development and operation of virtual worlds. Furthermore, a system such as the virtual world registration configuration 1000 can permit segregation of the different user communities. Accordingly, the base virtual world 1002 does not require knowledge of the users of the other virtual worlds such as the virtual world 1006.

In the virtual world registration configuration 1000 the infrastructure of the virtual world layer 1006 can thus leverage the infrastructure of the base virtual world 1002, and require only enough capacity to support its own additional layer functionality and user community. Furthermore, the virtual world registration configuration 1000 can enable users of the virtual world layer 1006 to interact with users of the base virtual world 1002 while providing complete segregation between user communities.

The external virtual world registration provided in this manner by the virtual world registration configuration 1000 enables augmented functionality of an existing base virtual world such as the base virtual world 1002 without modification to the base virtual world 1002 itself. The registered layered virtual world can communicate with the base virtual world 1002 rather than directly with a client. This enables extension of the functionality of the base virtual world 1002 without modification to the infrastructure of the base virtual world 1002. The virtual world layer 1006 does not necessarily add any additional virtual space to the base virtual world 1002. However, it does add functionality and objects to those provided within the space of the base virtual world 1002.

The virtual world registration configuration 1000 can thus permit the virtual world layer 1006 to register itself with the base virtual world 1002. The registration process can inform the base virtual world 1002 of the objects, and functions the virtual world layer 1006 can provide and perform. When a client performs an action that requests functionality not provided by the base virtual world 1002, the base virtual world 1002 can forward the request to the virtual world layer 1006. The virtual world layer 1006 can process the request, and return the results to the base virtual world 1002. The base virtual world 1002 can then forward the results to the requesting client. The registration process performed by the virtual world registration configuration 1000 may be embodiment dependant with multiple distinct methods for selecting and expanding functionality from the base virtual world 1002 to any number of registered layers.

A virtual world can be a complex system made up of computational hardware, data storage devices, data communications devices, executable software systems, and data. These systems may be decomposed into a client half and a server half. The client half can render a virtual world and enable users to interact with any number of objects. The server half can simulate interactions, maintain virtual world states, coordinate participants, persist data, communicate the state of the virtual world to clients, and provide any other virtual world functionality. The server infrastructure for layered virtual worlds operating according to the various embodiments can execute on server systems or other types of computer systems connected to a computer network, including computer networks coupled to the internet. The server infrastructure for operation of the virtual worlds can include the computers, storage and network equipment that provide the physical infrastructure to support the virtual worlds.

A preferred embodiment can include a system or method for encapsulating, transmitting, and installing any of the software components of a virtual world layer, also known as content. The content can be separate from the installing, maintaining and running of the virtual world server. A business model used by a company that creates virtual world content can be different from the business model used by a company that operates virtual world servers. It is therefore advantageous to enable such companies to operate independently and communicate through a standard. A layered virtual world package or bundle can provide this capability.

Thus, a registration virtual world 1006 can notify a base virtual world 1002 of its existence as shown in block 1052 of the virtual world registration process 1050. The registration virtual world 1006 can also notify the base virtual world 1002 of its intention to overlay the base virtual world 1002 as shown in block 1054. It can notify the base 1002 which objects, data, etc. it can use when the overlay is accomplished as shown in block 1056. The functionality or functionalities of the base virtual worlds 1002 to be augmented by the layer 1006 can also be communicated to the base virtual world 1002 as shown in block 1058. The base virtual world 1002 can add the virtual world layer 1006 to its list of users as shown in block 1060. In a preferred embodiment the base virtual world 1002 and the virtual world layer 1006 can maintain segregated user lists as shown in block 1062.

Referring now to FIG. 11, there is shown an embodiment of the virtual world layer package and method 1100. The components of the virtual world layer package 1100 can be assembled as shown in block 1110 to create the package as shown in block 1112. The package can be encapsulated as shown in block 1114 and, optionally, can be compressed as shown in block 1116. The package can be uploaded as shown in block 1118 and transmitted to its operational environment where it can be unpacked as shown in block 1120. The provisioning specification can be read and parsed as shown in block 1122 and the infrastructure of the operational environment can be provisioned accordingly as shown in block 1124. The package can be installed and executed as shown in block 1126.

Figure 12A:
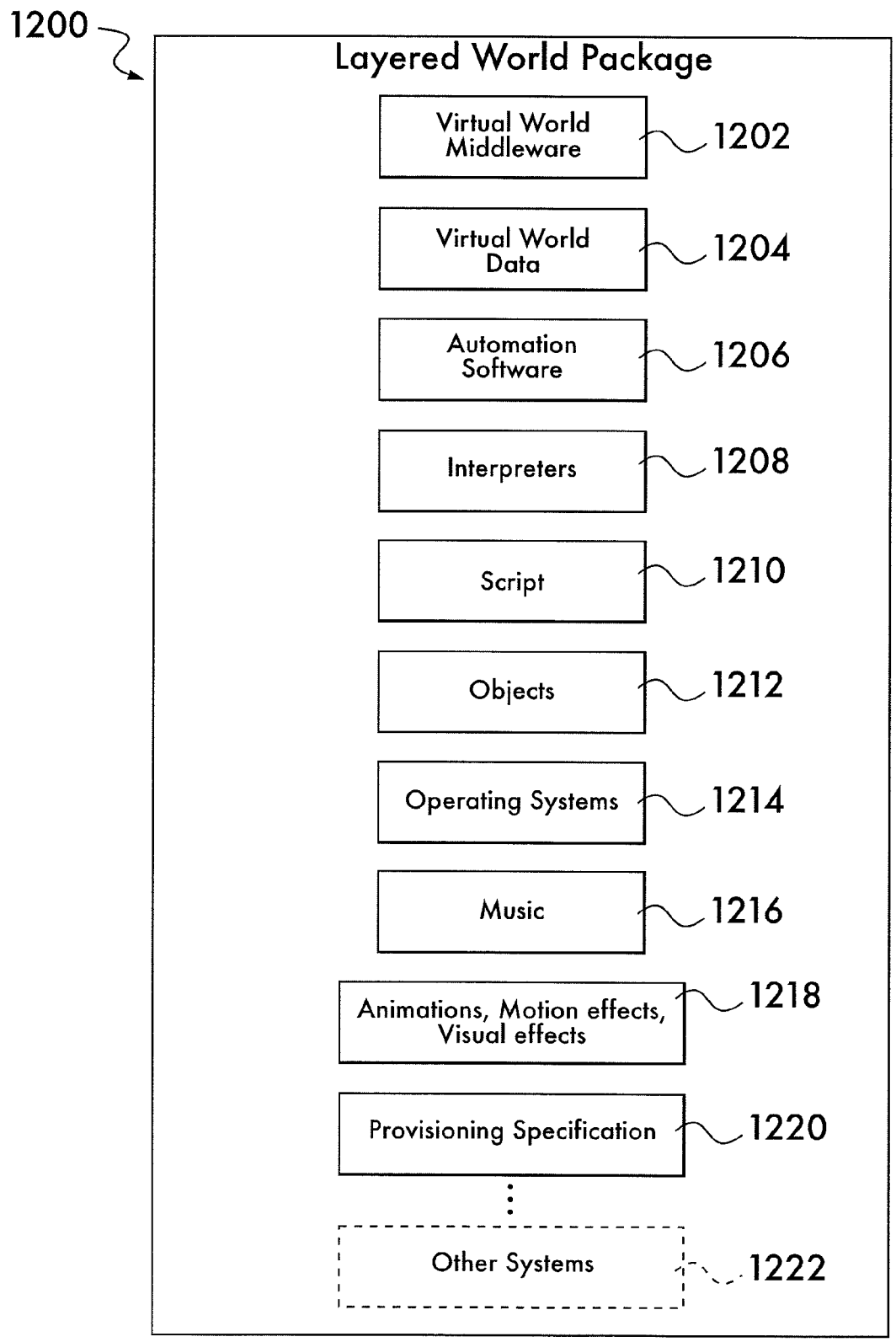
FIGS. 12A,B are schematic representations of an alternate embodiment of the virtual world layer package and method of FIG. 11.

Referring now to FIG. 12A, there is shown an alternate embodiment virtual world layer package 1200. The virtual world layer package 1200 can be a collection of the executable software required for installing and operating a layered virtual world according to the present invention. It can include any type of middleware 1202, virtual world data 1204, automation software 1206, and infrastructure specification that can be parts of, or useful for the operation of, a virtual world such as those including the virtual world layers 26, 36, 46*a-n*, 46*a-m*, 56*a,b*, 66*a,b*, 76*a,b*, 86, 96, 1006. For example, the virtual world layer package 1200 can also include any interpreters 1208 that may be required for interpreting any script 1210 that may be within it or at any other locations. It can also include any other objects 1212 or software useful or required for operation of a virtual world, such as any special operating systems 1214, music 1216, animation, sound effects, motion effect or visual effects 1218, provisioning specification 1220, and any other systems 1222 or objects.

The virtual world layer package 1200 can be encapsulated such that it can be copied and delivered from a virtual world content creator to a virtual world operator. A virtual world layer package 1200 can be a single object that is itself an aggregation of all of the objects relevant to a layered virtual world or a portion of the objects relevant to the layered virtual world. The virtual world layer package 1200 may utilize compression technologies to reduce its size, but this is not a requirement. In addition to the layered virtual world objects, the virtual world layer package 1200 may also contain an infrastructure provisioning specification 1220, as well as installation automations.

The virtual world layer package 1200 is not required to define all objects within a virtual world. Some virtual world layer packages 1200 may define only the objects they are overriding within another virtual world on which it the package is to be deployed. The layer package may define the objects to override using references to the base world objects UUID or any other types of references known to those skilled in the art. It should be noted that virtual world layer packages 1200 may be chained, such that one virtual world layer package 1200 references another virtual world layer package 1200 and the base virtual world modifications are inherited through package references.

The provisioning specification of a virtual world layer package can include computing resources, operating system specifications, external middleware, external middleware configuration and networking configuration. Additionally, the provisioning specification may describe methods for user accounting support infrastructure. User and customer groups, rights and authorities are likewise specified in the provisioning package. In some embodiments, the specification may also describe external account authentication or authorization directories, such as LDAP, to use for authentication and authorization. Furthermore, in some embodiments a provisioning specification may specify a unique identifier for the layered virtual world and communication protocols including communication protocols that are different from the ones used by the base virtual world.

Figure 12B:
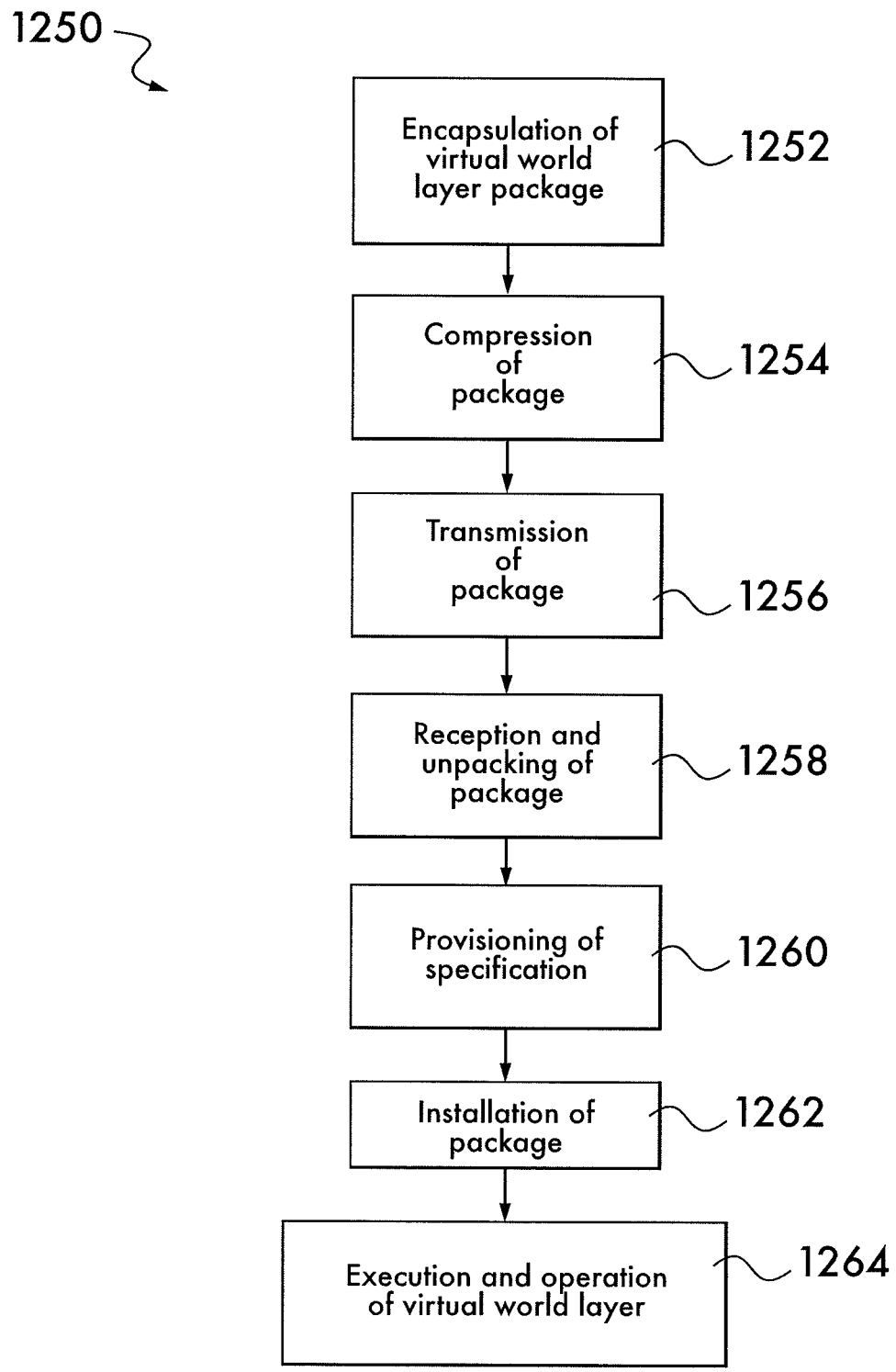

Referring now to FIG. 12B, there is shown an alternate embodiment of a virtual world encapsulation process 1250 for packaging and using a virtual world layer package. Once a layered virtual world package such as the virtual world layer package 1100 is created or partially created and encapsulated as shown in block 1252, it can be compressed as shown in block 1254. It can be transmitted to the infrastructure of an operator of a layered virtual world system as shown in block 1256. The virtual world layer package 1100 can be used for transmitting virtual world objects when the objects are packaged and shipped to the user on media, initially downloaded, downloaded as needed or transmitted any other way.

A virtual world layer package 1100 can be encapsulated using any encapsulation technology known to those skilled in the art and agreed upon by, for example, a content creation company and a virtual world operating company. An operating company can receive and encapsulate the virtual world layer package 1100 and provide access to storage for the content to be uploaded. The virtual world layer package 1100 may be delivered from the content creator to the operator via any common and mutually agreed upon network communications protocols. The possible communications protocols for transmitting a virtual world layer package 1100 can include protocols such as the well known Internet Protocols and File Transfer Protocol, physical communications such as DVD transfer via courier, or any other protocol.

A transmitted virtual world layer package 1100 received by an operator infrastructure it can be received and unpacked as shown in block 1258. Any method known to those skilled in the art can be used to extract the individual components from the transmitted layered virtual world package 1100. Provisioning specification can then be performed as shown in 1260. In this step the operator installation or other entity receiving a package can read the infrastructure provisioning specification and provision the appropriate computing, storage, operating system, middleware and network. The installation of the virtual world layer package 1100 on servers or other kinds of operational infrastructure can be performed as shown in block 1262.

When the infrastructure is provisioned according to specification of the virtual world layer package 1100, an installation automation can execute in any manner known to those skilled in the art as shown in block 1264. The installation automation can distribute the layered virtual world objects and begin execution of middleware and software components required to operate the virtual world of the virtual world layer package 1100. The installation automation can also create any user or customer account information that may be required. When the installation automation has completed its tasks, users can access the layered virtual world using the identifiers and protocols specified in the provisioning specification.

While the invention has been described in detail and with reference to specific examples thereof, it will be apparent to one skilled in the art that various changes and modifications can be made therein without departing from the spirit and scope thereof.

What is claimed is:

1. A computer-implemented method comprising:
providing a base virtual world having base virtual world functionality and having a list of base virtual world users;
coupling a first virtual world layer to the base virtual world, the first virtual world layer having first virtual world layer functionality not provided by the base virtual world and having a list of first virtual world layer users;
coupling a second virtual world layer to the first virtual world layer, the second virtual world layer having second virtual world layer functionality not provided by the first virtual world layer and not provided by the base virtual world layer and having a list of second virtual world layer users;
coupling a third virtual world layer to the second virtual world layer, the third virtual world layer having third virtual world layer functionality not provided by the second virtual world layer, not provided by the first virtual world layer, and not provided by the base virtual world layer and having a list of third virtual world layer users; and
providing access to at least a portion of each of the base virtual world functionality, the first virtual world layer functionality, the second virtual world layer functionality, and the third virtual world layer functionality via the third virtual world layer, wherein the first virtual world layer, the second virtual world layer, and the third virtual world layer are each registered as users of the base virtual world via the list of base virtual world users, wherein the base virtual world is added to a registration list of each of the first, second, and third virtual world layers.

2. The method of claim 1, further comprising:
providing user access to any of the base virtual world, the first virtual world layer, the second virtual layer, and any combination thereof according to a user command.

3. The method of claim 1, further comprising:
managing a state of a base virtual world object by the base virtual world to provide a base managed object;
managing a state of a layer virtual world object by the first virtual world layer to provide a layer managed object;
managing a state of the base managed object by the first virtual world layer to provide a further managed object; and
providing user access to the layer managed object and to the further managed object by the first virtual world layer.

4. The method of claim 3, further comprising:
providing user access to the base managed object by the first virtual world layer; and
providing user access to the base managed object by the second virtual world layer.

5. The method of claim 3, wherein the further managed object is independent of any instantiation of the base virtual world object in the first virtual world layer.

6. The method of claim 3, wherein the layer managed object is independent of any instantiation of the layer virtual world object in the base virtual world.

7. The method of claim 3, wherein a further managed state of the further managed object comprises an object persistence.

8. The method of claim 3, wherein a further managed state of the further managed object comprises an object texture.

9. The method of claim 1, further comprising:
managing a state of a base virtual world object by the base virtual world to provide a base managed object; and
managing a state of a base managed object by the second virtual world layer.

10. The method of claim 1, further comprising:
managing a second layer world virtual object by the second virtual world layer to provide a second layer managed object.

11. The method of claim 10, further comprising:
providing user access to the second layer managed object by the second virtual world layer.

12. The method of claim 1, wherein a further user is coupled to the second virtual world layer and the first virtual world layer communicates with the further user using substantially the same communication protocol that the second virtual world layer uses to communicate with the further user.

13. The method of claim 1, wherein a further user is coupled to the second virtual world layer and the first virtual world layer communicates with the further user using a communication protocol that is substantially different from the communication protocol that the second virtual world layer uses to communicate with the further user.

14. The method of claim 1, wherein the base virtual world has a base virtual world object which is unalterable by the first virtual world layer.

15. The method of claim 1, wherein the base virtual world operates on base virtual world infrastructure, the first virtual world layer operates on first virtual world layer infrastructure, the second virtual world layer operates on second virtual world layer infrastructure, and the base virtual world infrastructure is separate from both the first virtual world layer infrastructure and the second virtual world layer infrastructure.

16. The method of claim 1, further comprising:
segregating a user and a further user that are both coupled to the base virtual world for accessing the base world functionality.

17. The method of claim 1, further comprising:
each of the first virtual world layer, the second virtual world layer, and the base virtual world managing its own list of users independently of each other.

* * * * *